United States Patent
Oh et al.

(10) Patent No.: US 10,616,617 B2
(45) Date of Patent: Apr. 7, 2020

(54) METHOD AND APPARATUS FOR TRANSMITTING OR RECEIVING BROADCAST SIGNAL

(71) Applicant: LG Electronics Inc., Seoul (KR)

(72) Inventors: Hyunmook Oh, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/556,468

(22) PCT Filed: Apr. 22, 2016

(86) PCT No.: PCT/KR2016/004218
§ 371 (c)(1),
(2) Date: Sep. 7, 2017

(87) PCT Pub. No.: WO2016/171508
PCT Pub. Date: Oct. 27, 2016

(65) Prior Publication Data
US 2018/0041784 A1  Feb. 8, 2018

Related U.S. Application Data

(60) Provisional application No. 62/232,468, filed on Sep. 25, 2015, provisional application No. 62/167,878, filed on May 28, 2015, provisional application No. 62/151,446, filed on Apr. 23, 2015.

(51) Int. Cl.
*H04N 21/2362* (2011.01)
*H04N 21/4363* (2011.01)
(Continued)

(52) U.S. Cl.
CPC ........ *H04N 21/2362* (2013.01); *H04N 9/44* (2013.01); *H04N 21/235* (2013.01);
(Continued)

(58) Field of Classification Search
CPC ... H04N 21/235; H04N 21/2362; H04N 21/84
(Continued)

(56) References Cited

U.S. PATENT DOCUMENTS

2015/0042887 A1* 2/2015 Schanin ........... H04N 21/43635
 348/706
2015/0110399 A1* 4/2015 Valdes Lopez ...... H04N 1/4074
 382/167
(Continued)

FOREIGN PATENT DOCUMENTS

KR  10-2007-0023195 A  2/2007
KR  10-2013-0026322 A  3/2013
(Continued)

*Primary Examiner* — Nasser M Goodarzi
*Assistant Examiner* — Jaycee Imperial
(74) *Attorney, Agent, or Firm* — Dentons US LLP

(57) ABSTRACT

The present invention relates to a video data processing method for transmitting or receiving image quality improvement metadata and display metadata. The video data processing method may comprise the steps of: acquiring display metadata of a sync device; decoding a video signal and acquiring image quality improvement metadata; and transmitting the decoded video data and the image quality improvement metadata.

2 Claims, 18 Drawing Sheets

(51) Int. Cl.
  *H04N 21/436*  (2011.01)
  *H04N 21/235*  (2011.01)
  *H04N 21/44*   (2011.01)
  *H04N 9/44*    (2006.01)
  *H04N 21/84*   (2011.01)
  *H04N 9/69*    (2006.01)

(52) U.S. Cl.
  CPC . *H04N 21/43615* (2013.01); *H04N 21/43635* (2013.01); *H04N 21/44* (2013.01); *H04N 21/84* (2013.01); *H04N 9/69* (2013.01)

(58) Field of Classification Search
  USPC .......................................................... 725/116
  See application file for complete search history.

(56) References Cited

U.S. PATENT DOCUMENTS

| | | | | |
|---|---|---|---|---|
| 2015/0271525 A1* | 9/2015 | Hendry | .................. | H04N 19/46 375/240.27 |
| 2015/0358646 A1* | 12/2015 | Mertens | ............... | H04N 1/6058 382/166 |
| 2016/0088281 A1* | 3/2016 | Newton | .................. | H04N 19/17 348/43 |
| 2016/0134832 A1* | 5/2016 | Yamamoto | ............. | H04N 19/70 386/248 |
| 2016/0163356 A1* | 6/2016 | De Haan | ........ | H04N 21/234327 386/241 |
| 2016/0241829 A1* | 8/2016 | Qu | ......................... | G09G 5/006 |
| 2016/0286241 A1* | 9/2016 | Ridge | .................. | H04N 19/186 |

FOREIGN PATENT DOCUMENTS

| | | | | |
|---|---|---|---|---|
| KR | 10-2014-0098545 A | 8/2014 | | |
| KR | 10-1438672 B1 | 9/2014 | | |
| KR | 10-2015-0002440 A | 1/2015 | | |
| WO | WO-2014128586 A1 * | 8/2014 | ........... | H04N 1/6058 |
| WO | WO-2014181220 A1 * | 11/2014 | ............. | H04N 19/17 |
| WO | WO-2014203746 A1 * | 12/2014 | ............. | H04N 19/70 |
| WO | WO-2015007910 A1 * | 1/2015 | ..... | H04N 21/234327 |
| WO | WO-2015050857 A1 * | 4/2015 | ............. | G09G 5/006 |

* cited by examiner

FIG. 3

| | | | | | | | | |
|---|---|---|---|---|---|---|---|---|
| InfoFrame Type Code | across | InfoFrame Type = 0×08 (HDR/WCG video InfoFrame) | | | | | | |
| InfoFrame Version Number | Version = 0×01 | | | | | | | |
| Length of InfoFrame | Length of following InfoFrame ( ) | | | | | | | |
| Data Byte 1 general info | | | | | | Frame grouping type | | |
| Data Byte 2 general info | | | | | Update from previous frame info | Cancel previous info | Reuse current info | End of HDR/WCG video information |
| Data Byte 3 input/output video info | | | | | | | Current video info present | Target info present |
| Data Byte 4 mapping type | | | Dynamic range mapping type | | | Color mapping type | | |
| Data Byte 5 color space related info | | Color precision | | | Color space type | | | Constant luminance |
| Data Bytes | Current Video Information (If Current video info present == 1) | | | | | | | |
| Data Bytes | Target Information (If Target info present == 1) | | | | | | | |
| Data Bytes | Dynamic Range Mapping Information (Dynamic range mapping type) | | | | | | | |
| Data Bytes | Color Mapping Information (Color mapping type) | | | | | | | |

FIG. 4

| InfoFrame Type Code | InfoFrame Type = 0×02 | | | | | | |
|---|---|---|---|---|---|---|---|
| InfoFrame Version Number | Version = 0×02 or [0×03] | | | | | | |
| Length of AVI InfoFrame | Length of AVI InfoFrame (13) | | | | | | |
| Data Byte 1 | [Y2] | Y1 | Y0 | A0 | B1 | B0 | S1 | S0 |
| Data Byte 2 | C1 | C0 | M1 | M0 | R3 | R2 | R1 | R0 |
| Data Byte 3 | ITC | EC2 | EC1 | EC0 | Q1 | Q0 | SC1 | SC0 |
| Data Byte 4 | [VIC7] | VIC6 | VIC5 | VIC4 | VIC3 | VIC2 | VIC1 | VIC0 |
| Data Byte 5 | YQ1 | YQ0 | CN1 | CN0 | PR3 | PR2 | PR1 | PR0 |
| Data Byte 6 | ETB07-ETB00 (Line Number of End of Top Bar - lower 8 bits) | | | | | | |
| Data Byte 7 | ETB15-ETB08 (Line Number of End of Top Bar - upper 8 bits) | | | | | | |
| Data Byte 8 | SBB07-SBB00 (Line Number of Start of Bottom Bar - lower 8 bits) | | | | | | |
| Data Byte 9 | SBB15-SBB08 (Line Number of Start of Bottom Bar - upper 8 bits) | | | | | | |
| Data Byte 10 | ELB07-ELB00 (Pixel Number of End of Left Bar - lower 8 bits) | | | | | | |
| Data Byte 11 | ELB15-ELB08 (Pixel Number of End of Left Bar - upper 8 bits) | | | | | | |
| Data Byte 12 | SRB07-SRB00 (Pixel Number of Start of Right Bar - lower 8 bits) | | | | | | |
| Data Byte 13 | SRB15-SRB08 (Pixel Number of Start of Right Bar - upper 8 bits) | | | | | | |
| Data Byte 14 (general info) | | | | | Frame grouping type | | | |
| Data Byte 15 (general info) | | | | Update from previous frame info | Cancel previous info | Reuse current info | End of HDR/WCG video information |
| Data Byte 16 (input/output video info) | | | | | | | Current video info present | Target info present |
| Data Byte 17 (mapping type) | | Dynamic range mapping type | | | Color mapping type | | | |
| Data Byte 18 (color space related info) | | Color precision | | | Color space type | | | Constant luminance |
| (Data Bytes) | Current Video Information (If Current video info present == 1) | | | | | | |
| (Data Bytes) | Target Information (If Target info present == 1) | | | | | | |
| (Data Bytes) | Dynamic Range Mapping Information (Dynamic range mapping type) | | | | | | |
| (Data Bytes) | Color Mapping Information (Color mapping type) | | | | | | |

FIG. 5

| Byte# | bits | | | | | | | |
|---|---|---|---|---|---|---|---|---|
| | 7 | 6 | 5 | 4 | 3 | 2 | 1 | 0 |
| 1 | Tag Code (0×07) | | | Length of following data block = n bytes | | | | |
| 2 | Extended Tag Code (0×07)<br>- HDR/WCG<br>HDR/WCG video information data block | | | | | | | |
| 3 | CS_7 | CS_6 | CS_5 | CS_4 | CS_3 | CS_2 | CS_1 | CS_0 |
| 4 | | | | | | | CL_1 | CL_0 |
| 5 | | | | | | | CInfo | TInfo |
| 6 | DRM_7 | DRM_6 | DRM_5 | DRM_4 | DRM_3 | DRM_2 | DRM_1 | DRM_0 |
| 7 | CM_7 | CM_6 | CM_5 | CM_4 | CM_3 | CM_2 | CM_1 | CM_0 |

FIG. 6

Table 4-6 : Display Parameters Data Block

| Offset | Value | | | | | | | | Description/Format | |
|---|---|---|---|---|---|---|---|---|---|---|
| 00h | 01h | | | | | | | | DISPLAY PARAMETERS DATA BLOCK | TAC |
| 01h | 7 | 6 | 5 | 4 | 3 | 2 | 1 | 0 | BLOCK Revision and Other Data | |
| | | | | | | 0 | 0 | 0 | REVISION '0' | VALUES 0 → 7 |
| | 0 | 0 | 0 | 0 | 0 | | | | RESERVED | |
| 02h | 0Ch | | | | | | | | Number of Payload Bytes in BLOCK | 12 |
| 03h  04h | DESCRIPTOR | | | | | | | | Horizontal image size | Section 4.2.1 |
| 05h  06h | DESCRIPTOR | | | | | | | | Vertical image size | Section 4.2.1 |
| 07h  08h | DESCRIPTOR | | | | | | | | Horizontal pixel count | Section 4.2.1 |
| 09h  0Ah | DESCRIPTOR | | | | | | | | Vertical pixel count | Section 4.2.3 |
| 0Bh | DESCRIPTOR | | | | | | | | Feature Support Flags | Section 4.2.3 |
| 0Ch | DESCRIPTOR | | | | | | | | Transfer Characteristic Gamma | Section 4.2.4 |
| 0Dh | DESCRIPTOR | | | | | | | | Aspect Ratio | Section 4.2.5 |
| 0Eh | DESCRIPTOR | | | | | | | | Color Bit Depth | Section 4.2.6 |

| Offset | Value | | | | | | | | Description/Format |
|---|---|---|---|---|---|---|---|---|---|
| | 7 | 6 | 5 | 4 | 3 | 2 | 1 | 0 | |
| N | | | | | | | | | Color space<br>e.g.RGB, XYZ, ACES, L*a*b* |
| N+1 | 0 | 0 | 0 | 0 | 0 | 0 | | | Constant luminance (CL/non-CL) |
| N+2 | 0 | 0 | 0 | 0 | 0 | 0 | | | Current/Target info |
| N+3 | | | | | | | | | Dynamic range mapping<br>e.g.linear, logarithmic function, piecewise curve |
| N+4 | | | | | | | | | Color mapping<br>e.g.matrix conversion, LUT, adaptive mapping |

FIG. 7

Table 4-285 : Display Device Data Block

| Offset | Value | | | | | | | | Description/Format | |
|---|---|---|---|---|---|---|---|---|---|---|
| 00h | 0Ch | | | | | | | | DISPLAY DEVICE DATA BLOCK | TAG |
| 01h | 7 | 6 | 5 | 4 | 3 | 2 | 1 | 0 | BLOCK Revision and Other Data | |
|  |  |  |  |  |  | 0 | 0 | 0 | REVISION '0' | VALUES 0 → 7 |
|  | 0 | 0 | 0 | 0 | 0 |  |  |  | RESERVED | |
| 02h | 0Dh | | | | | | | | Number of Payload Bytes in BLOCK | 13 |
| 03h | DESCRIPTOR | | | | | | | | Display Device Technology | |
| 04h | DESCRIPTOR | | | | | | | | Device operating mode | |
| 05h → 08h | DESCRIPTOR | | | | | | | | Device native pixel format | |
| 09h → 0Ah | DESCRIPTOR | | | | | | | | Aspect ratio and orientation | |
| 0Bh | DESCRIPTOR | | | | | | | | Sub-pixel layout/configuration/shape | |
| 0Ch → 0Dh | DESCRIPTOR | | | | | | | | Horizontal and vertical dot/pixel pitch | |
| 0Eh | DESCRIPTOR | | | | | | | | Color bit depth | |
| 0Fh | DESCRIPTOR | | | | | | | | Response time | |

| Offset | Value | | | | | | | | Description/Format |
|---|---|---|---|---|---|---|---|---|---|
|  | 7 | 6 | 5 | 4 | 3 | 2 | 1 | 0 | |
| N |  |  |  |  |  |  |  |  | Color space<br>e.g.RGB, XYZ, ACES, L*a*b* |
| N+1 | 0 | 0 | 0 | 0 | 0 | 0 |  |  | Constant luminance (CL/non-CL) |
| N+2 | 0 | 0 | 0 | 0 | 0 | 0 |  |  | Current/Target info |
| N+3 |  |  |  |  |  |  |  |  | Dynamic range mapping<br>e.g.linear, logarithmic function, piecewise curve |
| N+4 |  |  |  |  |  |  |  |  | Color mapping<br>e.g.matrix conversion, LUT, adaptive mapping |

FIG. 9

| | | | | | | | | |
|---|---|---|---|---|---|---|---|---|
| InfoFrame Type Code | colspan="8" | InfoFrame Type = 0×07 |
| InfoFrame Version number | colspan="8" | Version = 0×01 |
| Length of Info Frame | colspan="8" | Length of following HDR Metadata InfoFrame |
| Data Byte 1 | F17=0 | F16=0 | F15=0 | F14=0 | F13=0 | colspan="3" | EOTF (3 bits) |
| Data Byte 2 | F27=0 | F26=0 | colspan="4" | Frame grouping type | colspan="2" | Static_Metadata Descriptor ID (3 bits) |
| Data Byte 3 (general info) | | | | | Update from previous frame info | Cancel previous info | Reuse current info | End of HDR/WCG video information |
| Data Byte 4 (input/output video info) | | | | | | | Current video info present | Target info present |
| Data Byte 5 (mapping type) | | colspan="4" | Dynamic range mapping type | colspan="3" | Color mapping type |
| Data Byte 6 (color space related info) | | colspan="3" | Color precision | colspan="3" | Color space type | Constant luminance |
| (Data Bytes) | colspan="8" | Current Video Information (If Current video info present == 1) |
| (Data Bytes) | colspan="8" | Target Information (If Target info present == 1) |
| (Data Bytes) | colspan="8" | Dynamic Range Mapping Information (Dynamic range mapping type) |
| (Data Bytes) | colspan="8" | Color Mapping Information (Color mapping type) |

FIG. 10
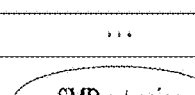
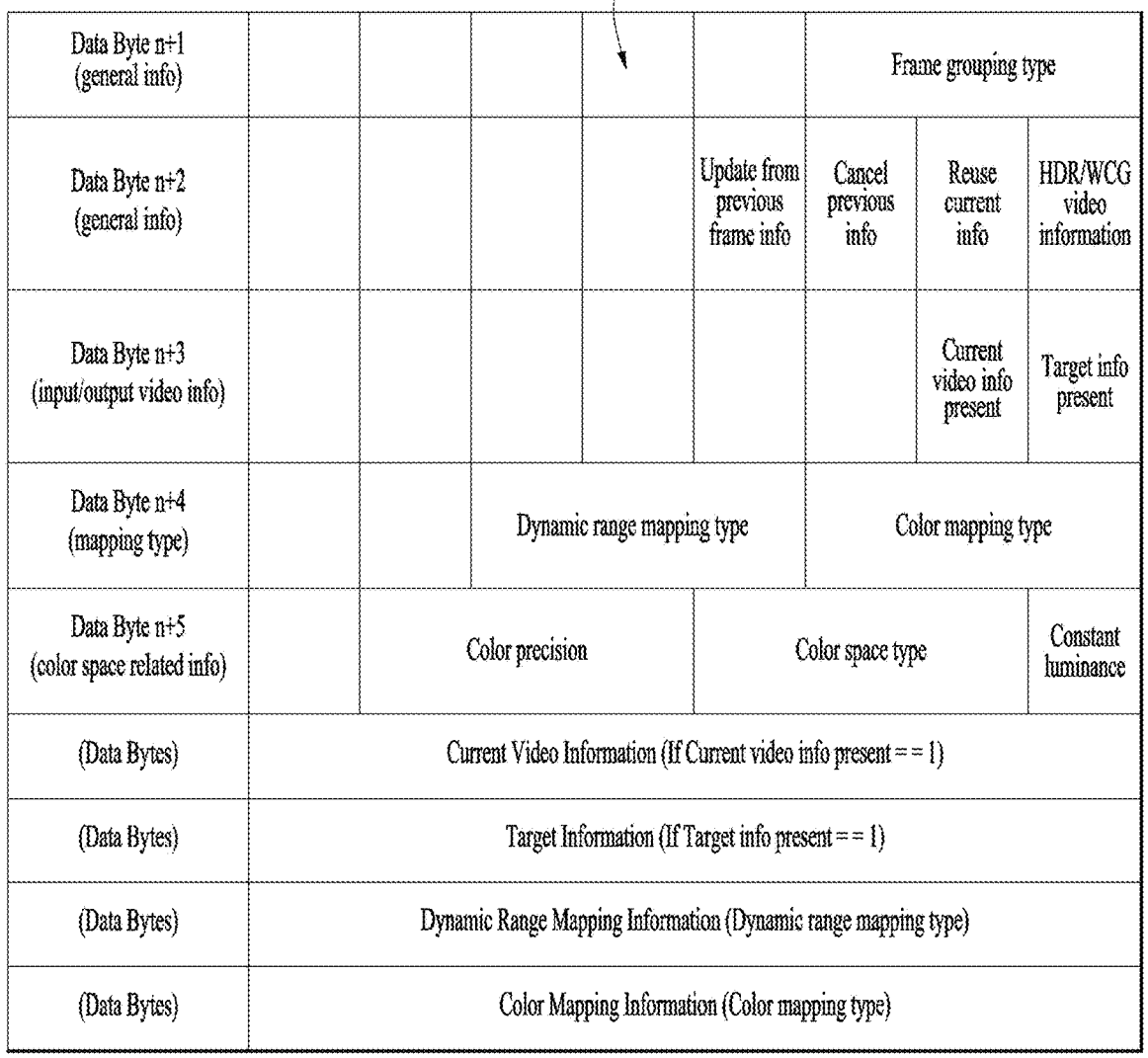

FIG. 12

| InfoFrame Type Code | InfoFrame Type = 0×07 | | | | | |
|---|---|---|---|---|---|---|
| InfoFrame Version number | Version = 0×01 | | | | | |
| Length of Info Frame | Length of following HDR Metadata InfoFrame | | | | | |
| Data Byte 1 | F17=0 | F16=0 | Extended_Metadata_Descriptor_ID | | | EOTF (3 bits) |
| Data Byte 2 | F27=0 | | Frame grouping type | | HDR/WCG video info Present flag | Static_Metadata_Descriptor ID (3 bits) |
| Data Byte 3 | Static_Metadata_Descriptor | | | | | |
| ... | ... | | | | | |
| Data Byte n | ... | | | | | |

| InfoFrame Type Code | InfoFrame Type = 0×08 (HDR/WCG video InfoFrame) | | | | | | |
|---|---|---|---|---|---|---|---|
| InfoFrame Version number | Version = 0×01 | | | | | | |
| Length of InfoFrame | Length of following InfoFrame ( ) | | | | | | |
| Data Byte 1 (general info) | Extended_Metadata_Descriptor ID | | | | Frame grouping type | | |
| Data Byte 2 (general info) | | | | Update on Dynamic Range and Mastering InfoFrame flag | Update from previous frame info | Cancel previous info | Reuse current info | End of HDR/WCG video information |
| Data Byte 3 (input/output video info) | | | | | | Current video info present | Target info present |
| Data Byte 4 (mapping type) | | | Dynamic range mapping type | | | Color mapping type | |
| Data Byte 5 (color space related info) | | Color precision | | | Color space type | | Constant luminance |
| (Data Bytes) | Current Video Information (If Current video info present == 1) | | | | | | |
| (Data Bytes) | Target Information (If Target info present == 1) | | | | | | |
| (Data Bytes) | Dynamic Range Mapping Information (Dynamic range mapping type) | | | | | | |
| (Data Bytes) | Color Mapping Information (Color mapping type) | | | | | | |

FIG. 13

| Byte# | bits | | | | | | | |
|---|---|---|---|---|---|---|---|---|
| | 7 | 6 | 5 | 4 | 3 | 2 | 1 | 0 |
| 1 | Tag Code (0×07) | | | Length of following data block = n bytes | | | | |
| 2 | Extended Tag Code (0×06) | | | | | | | |
| 3 | F37=0 | F36=0 | ET_5 | ET_4 | ET_3 | ET_2 | ET_1 | ET_0 |
| 4 | SM_7 | SM_6 | SM_5 | SM_4 | SM_3 | SM_2 | SM_1 | SM_0 |
| 5 | Desired Content Max Luminance data (8 bits) | | | | | | | |
| 6 | Desired Content Max Frame-average Luminance data (8 bits) | | | | | | | |
| 7 | Desired Content Min Luminance data (8 bits) | | | | | | | |

| | | | | | | | | |
|---|---|---|---|---|---|---|---|---|
| 8 | CS_7 | CS_6 | CS_5 | CS_4 | CS_3 | CS_2 | CS_1 | CS_0 |
| 9 | | | | | | | CL_1 | CL_0 |
| 10 | | | | | | | CInfo | TInfo |
| 11 | DRM_7 | DRM_6 | DRM_5 | DRM_4 | DRM_3 | DRM_2 | DRM_1 | DRM_0 |
| 12 | CM_7 | CM_6 | CM_5 | CM_4 | CM_3 | CM_2 | CM_1 | CM_0 |
| 13 | EM_7 | EM_6 | EM_5 | EM_4 | EM_3 | EM_2 | EM_1 | EM_0 |

FIG. 14

| Byte# | bits | | | | | | | |
|---|---|---|---|---|---|---|---|---|
| | 7 | 6 | 5 | 4 | 3 | 2 | 1 | 0 |
| 1 | Tag Code (0×07) | | | | Length of following data block = n bytes | | | |
| 2 | Extended Tag Code (0×07) - HDR/WCG video information data block | | | | | | | |
| 3 | CS_7 | CS_6 | CS_5 | CS_4 | CS_3 | CS_2 | CS_1 | CS_0 |
| 4 | DRMI reg | | | | | | CL_1 | CL_0 |
| 5 | | | | | | | CInfo | TInfo |
| 6 | DRM_7 | DRM_6 | DRM_5 | DRM_4 | DRM_3 | DRM_2 | DRM_1 | DRM_0 |
| 7 | CM_7 | CM_6 | CM_5 | CM_4 | CM_3 | CM_2 | CM_1 | CM_0 |
| 8 | EM_7 | EM_6 | EM_5 | EM_4 | EM_3 | EM_2 | EM_1 | EM_0 |

FIG. 15

| | | | | | | | |
|---|---|---|---|---|---|---|---|
| InfoFrame Type Code | colspan="7" | InfoFrame Type = 0x08 (HDR/WCG video InfoFrame) |
| InfoFrame Version Number | colspan="7" | Version = 0x01 |
| Length of Info Frame | colspan="7" | Length of following InfoFrame ( ) |
| Data Byte 1 (general info) | colspan="3" | Extended_Metadata_Descriptor ID | colspan="4" | Frame grouping type |
| Data Byte 2 (general info) | multiple info flag | | Update on Dynamic Range and Mastering InfoFrame flag | Update from previous frame info | Cancel previous info | Reuse current info | End of HDR/WCG video information |
| Data Byte 3 (input/output video info) | | | | | Local feature info present | Current video info present | Target info present |
| Data Byte 4 (mapping type) | | colspan="3" | Dynamic range mapping type | colspan="3" | Color mapping type |
| Data Byte 5 (color space related info) | | colspan="3" | Color precision | colspan="2" | Color space type | Constant luminance |
| Data Byte 6-7 (multiple info description) | | | | multiple target flag | multiple method flag | multiple local feature flag | multiple view flag |
| | colspan="7" | Number of information sets |
| Data Byte 8 | colspan="7" | Length of information set A |
| Data Bytes (options for metadata set A) | exclusive info flag | subset existence flag | colspan="2" | Total number of subsets | colspan="3" | Subset number |
| | colspan="7" | information type |
| (Data Bytes) | colspan="7" | Current Video Information (If Current video info present == 1) |
| (Data Bytes) | colspan="7" | Target Information (If Target info present == 1) |
| (Data Bytes) | colspan="7" | Dynamic Range Mapping Information (Dynamic range mapping type) |
| (Data Bytes) | colspan="7" | Color Mapping Information (Color mapping type) |
| (Data Bytes) | colspan="7" | Local feature information (if local feature info present == 1) |
| | colspan="7" | ... |
| Data Byte | colspan="7" | Length of information set X |
| Data Bytes (options for metadata set X) | exclusive info flag | subset existence flag | colspan="2" | Total number of subsets | colspan="3" | Subset number |
| (Data Bytes) | colspan="7" | Current Video Information (If Current video info present == 1) |
| (Data Bytes) | colspan="7" | Target Information (If Target info present == 1) |
| (Data Bytes) | colspan="7" | Dynamic Range Mapping Information (Dynamic range mapping type) |
| (Data Bytes) | colspan="7" | Color Mapping Information (Color mapping type) |
| (Data Bytes) | colspan="7" | Local feature information (if local feature info present == 1) |

FIG. 16

| Byte# | bits | | | | | | | |
|---|---|---|---|---|---|---|---|---|
| | 7 | 6 | 5 | 4 | 3 | 2 | 1 | 0 |
| 1 | Tag Code (0×07) | | | Length of following data block = n bytes | | | | |
| 2 | Extended Tag Code (0×07) - HDR/WCG video information data block | | | | | | | |
| 3 | CS_7 | CS_6 | CS_5 | CS_4 | CS_3 | CS_2 | CS_1 | CS_0 |
| 4 | DRMI_reg | | | | | | CL_1 | CL_0 |
| 5 | | | | | | | CInfo | TInfo |
| 6 | DRM_7 | DRM_6 | DRM_5 | DRM_4 | DRM_3 | DRM_2 | DRM_1 | DRM_0 |
| 7 | CM_7 | CM_6 | CM_5 | CM_4 | CM_3 | CM_2 | CM_1 | CM_0 |
| 8 | EM_7 | EM_6 | EM_5 | EM_4 | EM_3 | EM_2 | EM_1 | EM_0 |
| 9 | | | | | Multi_EM_3 | Multi_EM_2 | Multi_EM_1 | Multi_EM_0 |

METHOD AND APPARATUS FOR TRANSMITTING OR RECEIVING BROADCAST SIGNAL

This application is a National Stage of International Application No. PCT/KR2016/004218, filed Apr. 22, 2016, which claims the benefit of U.S. Provisional Application No. 62/151,446, filed on Apr. 23, 2015, 62/167,878, filed on May 28, 2015 and 62/232,468, filed Sep. 25, 2015, all of which are hereby incorporated by reference in their entirety for all purposes as if fully set forth herein.

TECHNICAL FIELD

The present invention relates to a device and method for transmitting/receiving a broadcast signal.

BACKGROUND ART

With the development of digital technology and communication technology, demand for and propagation of audio/video based multimedia content are rapidly increasing in various areas such as the Internet and personal media as well as broadcast and movies. Furthermore, consumer demand for immersive media, which provide realism to broadcast and movies, is increasing. In addition, as home TV screens become large with the development of display technology, demand for realistic content beyond high definition (HD) is increasing. Realistic broadcasting such as UHDTV (Ultra High Definition TV) along with 3DTV attracts attention as a future broadcast service. Particularly, UHD broadcast services are increasingly being discussed.

DISCLOSURE

Technical Problem

An object of the present invention is to improve transmission efficiency in a method and device for transmitting a broadcast signal.

Another object of the present invention is to provide a transmission device and method for transmitting metadata for dynamically providing a dynamic range and a color gamut of content.

Technical Solution

A method of processing video data according to an embodiment of the present invention includes: acquiring display metadata of a sink device; decoding a video signal and acquiring video enhancement metadata; and transmitting decoded video data and video enhancement metadata.

A method of processing video data according to an embodiment of the present invention includes: transmitting display metadata; receiving video data and video enhancement metadata; and processing the video data on the basis of the video enhancement metadata.

Advantageous Effects

According to embodiments of the present invention, it is possible to exchange information between a display device and an external device.

According to embodiments of the present invention, the display device and the external device can transmit and receive information necessary for adaptive video post-processing for high-definition images.

According to embodiments of the present invention, the display device and the external device can transmit and receive information about display characteristics.

DESCRIPTION OF DRAWINGS

FIG. 3 illustrates InfoFrame including dynamic range information and color gamut information according to an embodiment of the present invention.

FIG. 4 illustrates InfoFrame including dynamic range information and color gamut information according to another embodiment of the present invention.

FIG. 5 illustrates a method of delivering display related information using extended display identification data according to an embodiment of the present invention.

FIG. 6 illustrates a method of delivering display related information using extended display ID according to another embodiment of the present invention.

FIG. 7 illustrates a method of delivering display related information using extended display ID according to another embodiment of the present invention.

FIG. 9 illustrates a method of extending a static metadata descriptor ID and delivering video information to a sink device according to an embodiment of the present invention.

FIG. 10 illustrates a method of extending a static metadata descriptor ID and delivering video information to a sink device according to another embodiment of the present invention.

FIG. 12 illustrates a method of defining separate InfoFrame for video information according to an embodiment of the present invention.

FIG. 13 illustrates a method of delivering sink device information to a source device according to an embodiment of the present invention.

FIG. 14 illustrates a method of delivering sink device information to a source device according to an embodiment of the present invention.

FIG. 15 illustrates a method of defining separate InfoFrame for video information according to an embodiment of the present invention.

FIG. 16 illustrates a method of delivering multiple pieces of information of a sink device to a source device according to an embodiment of the present invention.

BEST MODE

Figure 1:
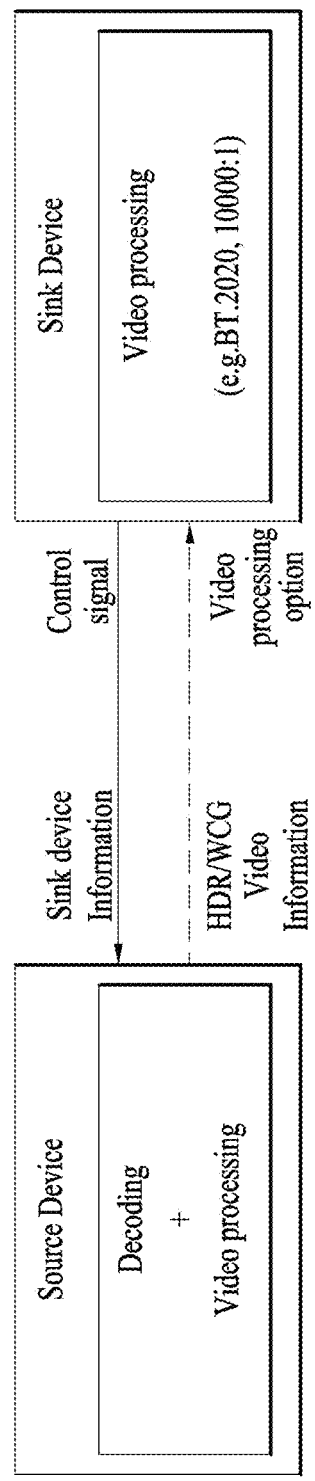
FIG. 1 illustrates a method of delivering information between a source device and a sink device according to an embodiment of the present invention.

The present invention provides a method for converting and presenting content as images with enhanced video quality by transmitting, to a receiver, a factor which can adaptively adjust the content for characteristics of various scenes included in the content when high dynamic range (HDR) content which can be represented in a wide range of luminance is provided. UHD broadcast can be discriminated from conventional broadcast and can provide high level of presence by representing luminance which cannot be expressed in conventional content. As a dynamic range of images increases according to introduction of HDR (high dynamic range), a characteristic difference between scenes included in content may increase. Accordingly, a broadcast transmission device can additionally provide information for effectively displaying characteristics of each scene on a display and a reception device can present images through a method suitable for a producer's intention by providing video effects on the basis of the transmitted information.

UHD broadcast can provide enhanced video quality and immersiveness to viewers through various methods compared to HD broadcast. As one such method, UHD broadcast can provide a method of extending ranges of representation of luminance and color expressed in content to luminance and color recognition ranges which can be recognized by the human visual system. That is, HDR (high dynamic range) and WCG (wide color gamut) can be applied to UHD content. That is, content with enhanced contrast and colors is provided such that a UHD content user can experience improved immersiveness and presence. The present invention provides a method for effectively presenting luminance and color of images of content depending on intention of a producer when the content is presented through a display such that a user can view images with enhanced video quality.

Presence and immersiveness which can be provided by UHDTV provide enhanced viewer experiences in various storage media and services as well as broadcast and thus receive attention. To provide UHD content discriminated from previous video content and the same experiences as user experiences of acquiring information through actual visual recognition instead of viewing images through screens, a color gamut and a dynamic range as well as a large screen become important. To this end, while video enhancement algorithms are developed and standardized and research on display manufacturing is conducted, various display characteristics need to be supported for settling services after initiation thereof. To view UHD content, an external device connected to a UHD display, such as an STB or a Blu-ray disc player, or an external device for supporting more enhanced video processing performance than the UHD display may be used. The present invention proposes a signaling method for overcoming the limits of interfaces which connect a display and an external device to correctly deliver information about display performance and characteristics to external devices such that the external devices perform content conversion adapted to display characteristics, providing an environment in which viewers can view UHD content in an optimal environment.

The present invention provides a method of delivering information between a display device (referred to as a sink device hereinafter) and an external device (referred to as a source device hereinafter) connected to the display device. That is, the sink device may deliver characteristics thereto to the source device, and the source device may deliver information about adaptive content conversion to the sink device. Accordingly, the sink device can adaptively convert content delivered from the source device thereto to provide images with enhanced video quality to users.

FIG. 1 illustrates a method of delivering information between a source device and a sink device according to an embodiment of the present invention. In the present invention, the source device may perform video decoding and video processing and the sink device may perform video processing and video output. For example, the source device may be a device which performs decoding and video processing on video signals received through various paths such as broadcast, storage media such as Blu-ray disc (BD)/UV/SCSA and IP streaming Specific examples of the source device include a set top box (STB), BD/UV/SCSA player, PC, etc. Here, video processing of the source device may include video processing for video enhancement such as WCG and HDR.

The source device may perform video processing on the basis of sink device information delivered from the sink device. The sink device information may include display related information of the sink device, for example, information about color gamut or dynamic range. In this case, the source device can provide picture quality suitable for display characteristics of the sink device on the basis of the sink device information. To this end, the sink device may provide display metadata to the source device. Here, the display metadata may include the aforementioned display related information of the sink device. In addition, the source device may provide metadata of a finally output image. The metadata of the output image may include video information applied to video processing, for example, information related to HDR and WCG.

The aforementioned video processing may be performed in the sink device according to an embodiment. This can be applied when the video processing performance provided by the sink device is higher than that of the source device. In this case, the source device can deliver information necessary for video processing, for example, HDR and WCG related information and information about video processing operations to the sink device. A description will be given of information exchange between the source device and the sink device.

Figure 2:
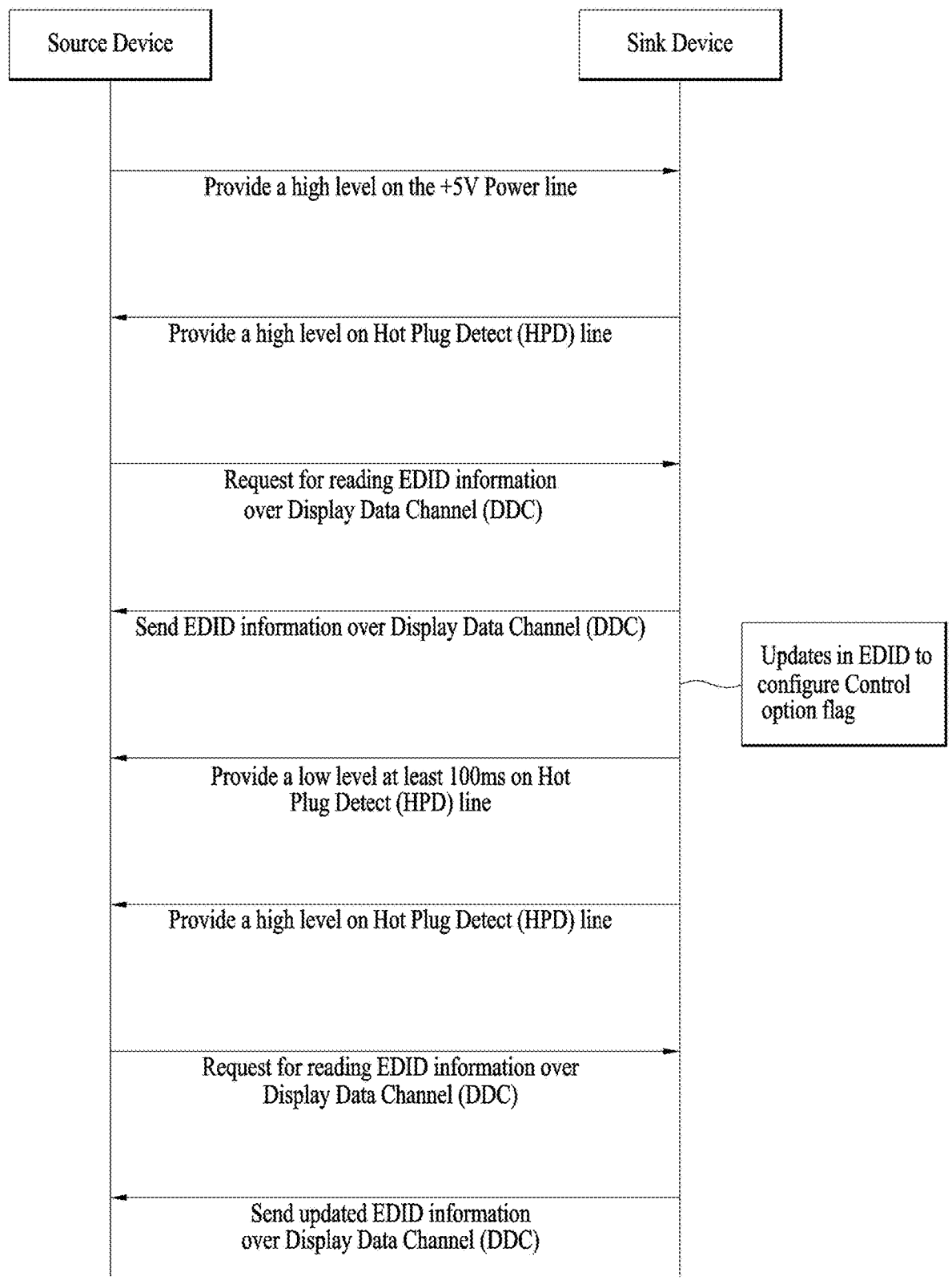
FIG. 2 is a flowchart illustrating information exchange between a source device and a sink device according to an embodiment of the present invention.

FIG. 2 is a flowchart illustrating information exchange between the source device and the sink device according to an embodiment of the present invention. The figure shows a method of exchanging information through an HDR data block included in extended display identification data (EDID) when the source device and the sink device are connected through a wired interface (e.g., HDMI or a display port). That is, the figure shows a method through which the source device reads changed EDID of the sink device when the sink device activates or deactivates HDR and WCG functions of the source device. When the source device is connected to the sink device through the wired interface, the source device may provide a high level voltage on a +5V power line of the wired interface (step 1). Accordingly, the sink device can confirm connection of the source device. Then, the sink device may provide a high level voltage on a hot plug detect (HPD) line maintained at a low level voltage (step 2). Accordingly, the sink device notifies the source device that connection is completed and reading of EDID is ready. The source device may check transition of the HPD line to a high level and deliver a request for reading EDID information to the sink device over a display data channel (DDC) (step 3). In response to this, the sink device may send EDID information over the DDC (step S4). Thereafter, a control option flag of an HDR data block of the EDID may be changed at the request of a user or according to functional determination of the sink device (step 5). In this case, the sink device may provide a low level voltage on the HPD line for at least 100 ms in order to notify the source device of EDID update (step 6). When the sink device can read the EDID, the sink device may apply a high level voltage to the HPD line (step 7). The source device detects application of the high level voltage and may make a request to read EDID over the DDC (step 8). The sink device may send the updated EDID information over the DDC (step 9).

Next, a method of exchanging information necessary for video processing for video enhancement between the source device and the sink device will be described using the aforementioned flowchart.

According to an embodiment of the present invention, the source device may deliver a request for display metadata in the aforementioned step 3 or 8 and the sink device may send the display metadata to the source device in step 4 or 9. Here, the display metadata may include information about a color gamut and brightness of the sink device. Color gamut information may include information about color primary coordinates on a CIE xy diagram of colors corresponding to RGBW or a standard color gamut such as BT.709 and BT.2020. Such display metadata may be delivered through a color characteristics data block of a display ID (DisplayID). Brightness related information corresponds to maximum and minimum brightness values and may be delivered through a data block defined in DisplayID, EDID, EDID extension and the like.

The source device may determine whether color and brightness information of video content needs to be adjusted on the basis of the delivered display metadata. When color and brightness need to be adjusted, the source device delivers necessary information along with decoded video to the sink device. Here, color gamut and dynamic range related metadata about the video may be delivered through AVI InfoFrame and dynamic range and mastering InfoFrame.

When color mapping and dynamic range mapping are dynamically applied to each scene or frame, the source device needs to deliver information corresponding to each decoded scene or frame. Here, an interface standard for delivering a corresponding scene is needed, and the method described in the present invention can be used. The delivered information may include not only detailed information about color mapping and dynamic range mapping but also video format information before mapping and video format information targeted after mapping. In addition, the source device may deliver information indicating whether information has been updated from a previous frame (update from previous frame info), information indicating whether previous information is used (cancel previous info), information indicating whether the current information will be reused in the future (reuse current frame info), information indicating end of information per scene or frame (end of additional HDR video information), etc.

The sink device may perform video processing adapted for a scene and a frame on the basis of the video format information, color mapping information and dynamic range mapping information delivered from the source device. Here, the sink device may separately include a part for processing the corresponding information or process the corresponding information using a block included therein.

If feedback for a processing procedure between the source device and the sink device is required, feedback may be controlled through the control option flag.

A description will be given of an embodiment in which the source device delivers information necessary for video processing to the sink device.

In the present invention, information delivered from the source device to the sink device is additional information about HDR/WCG factors of UHD content. Although the present invention is focused on delivery of information about HDR/WCG factors of UHD content, general information about UHD may be delivered. To deliver information from the source device to the sink device, the information may be delivered in the form of InfoFrame. In this case, new InfoFrame may be defined, previously defined AVI InfoFrame may be extended, or dynamic range and mastering InfoFrame may be extended to deliver additional information about HDR/WCG factors of UHD content from the source device to the sink device. A description will be given of an embodiment in which new InfoFrame is defined.

FIG. 3 illustrates InfoFrame including dynamic range information and color gamut information according to an embodiment of the present invention. In the present invention, the source device may deliver information to the sink device through newly defined InfoFrame. Here, the information delivered to the sink device may include information used for the sink device to accurately process HDR/WCG video. For example, the information may include processing information suitable for change over time in content, such as a scene or a frame. In the embodiment, information related to dynamic range mapping and color mapping is exemplified. Here, the information delivered from the source device to the sink device may additionally include video format information before and after video processing and may further include information about a color space in which mapping is performed and information for indicating whether information has been updated.

In the figure, InfoFrameType indicates the type of InfoFrame defined to provide additional information about HDR/WCG video. In the present embodiment, 0x08 can be allocated to InfoFrameType to represent that HDR video related additional information is provided.

Frame grouping type information indicates an HDR/WCG video information application unit. HDR/WCG video information can be applied on a scene-by-scene basis, a video clip-by-video clip basis or a frame-by-frame basis. The unit defined by this information can represent an application unit of information in InfoFrame proposed by the present invention. For example, when the frame grouping type information is set to 000 to designate a scene as a unit, the frame grouping type information can represent that target video information is equally applied in a specific scene. The frame grouping type information may represent application of HDR/WCG video information in units of scene when set to 000, in units of video clip when set to 001, in units of frame when set to 010, and in units of content when set to 011. Values from 100 to 111 may be reserved for future use. The frame grouping type information may be included in data byte 1 of HDR/WCG video InfoFrame.

Data byte 2 of the HDR/WCG video InfoFrame may include Update from Previous Frame Info, Cancel Previous Info, Reuse Current Info and End of HDR/WCG Video information.

Update from Previous Frame Info indicates whether there is an update from previous information when HDR/WCG video InfoFrames are continuously provided. For example, when the frame grouping type indicates a scene type, Update from Previous Frame Info can indicate whether information applied to the current scene has been updated from information applied to a previous scene. This information indicates update in an HDR/WCG video InfoFrame when set to 1 such that the following information in the HDR/WCG video InfoFrame is referred to. In addition, this information indicates that previously provided information can be used when set to 0. For example, when the frame grouping type indicates a scene type, this information can indicate that information applied to a previous scene can be applied to the current scene. Update from Previous Frame Info may be interpreted in association with the frame grouping type information. For example, even if the frame grouping type information indicates a frame type, every frame is not always updated. Accordingly, Update from Previous Frame Info may be subdivided and used.

Cancel Previous Info indicates whether previous information is used. This information indicates that corresponding information is not used when set to 1. For example, this information can indicate that information included in HDR/WCG video InfoFrame of a previous frame is not used when set to 1. That is, this information may be used to refresh HDR/WCG video InfoFrame. This information indicates that previous information can be used when set to 0. For example, when various types of HDR/WCG video information are provided, a case in which previous information is stored in a specific space and used may be considered. In this case, this information may be used for an operation of removing all of previous information and using only currently provided information. This field may be interpreted in association with the frame grouping type. For example, when the frame grouping type is a scene type and there is a scene change, this information can be used to indicate the scene change because information discriminated from previous information needs to be used.

Reuse Current Frame Info indicates whether information provided for the current frame can be used for a neighboring frame or can be used only for the current frame. This information may indicate that information provided for the current frame can be used in consecutive frames when set to 1. When a method of providing no additional information for consecutive frames on the basis of Reuse Current Frame Info is used, a data rate may be increased. On the other hand, this information indicates that information provided for the current frame can be used only for the current frame when set to 0. This field may be interpreted in association with the frame grouping type.

End of HDR/WCG Video information indicates end of HDR/WCG video information. For example, this information can indicate that corresponding InfoFrame is not used for frames provided when a program using the corresponding InfoFrame ends. In addition, this information may be used to indicate end/transition of a program or end of HDR/transition from HDR to standard dynamic range (SDR).

Data byte 3 of HDR/WCG video InfoFrame may include Current Video Info Present and Target Info Present.

Current Video Info Present indicates whether video information about the current frame is provided. When this information is 1, InfoFrame can provide detailed information through current video information included in N1 data bytes. The detailed information about the current video provided through the current video information may include information related to a dynamic range and a color gamut. For example, the current video information may include a subblock length and information of data bytes 0 to n+10. In the current video information, data byte n may include a white level, data byte n+1 may include a black level, and data bytes n+2, n+3, n+4, n+5, n+6 and n+7 may include Red-x, Red-y, Green-x, Green-y, Blue-x and Blue-y information, respectively. In addition, data bytes n+8 and n+9 may include white-x and white-y information and data byte n+10 may include precision information.

The white level is information used to indicate a dynamic range of video and represents a maximum luminance value. Here, luminance may represent physical luminance or may refer to maximum luminance relative to black, a maximum value in code values, or the like. When such meanings need to be used in a discriminative manner, types may be defined for respective meanings or values therefor may be separately defined and used.

The black level is contrast to the white level and refers to a minimum value in a dynamic range. The black level may represent different meanings like the white level, and when all the different meanings need to be represented, the meanings may be additionally defined and used.

In addition to the method of signaling HDR video properties through white/black levels as described in the above example, HDR video properties may be signaled through predefined HDR division in such a manner that DR characteristics of video are divided in stages according to f-stop. Further, a transfer function used to encode HDR video, for example, EOTF (electro-optical transfer function (gamma function or the like)) may be additionally signaled.

Red-x/-y, Green-x/-y and Blue-x/-y represent x and y color coordinates for indicating a color gamut. This information may represent arbitrary coordinates as in the example of the present invention, and in the case of a standard color gamut or a widely used color gamut, the color gamut may be signaled using a predetermined value.

White-x/-y represents color coordinates for indicating a white point. This information may represent arbitrary coordinates as in the example of the present invention. A standard white point or a widely used white point may be signaled using a predetermined value.

Additionally, information about a color volume used to encode colors of content may be additionally defined.

The Target Video Info Present indicates information about a result which is a target of video enhancement and video change of a corresponding frame/scene through HDR/WCG video InfoFrame. Here, the target may be a video format or a display. If it is necessary to set different targets for video and a display, the Target Video Info Present can be differently defined therefor. When this field is 1, detailed information may be provided through target video information. Detailed information about target video provided through the target video information may include dynamic range and color gamut related information. For example, the target video information may include a subblock length and data bytes n to n+9. Data byte n of the target video information may indicate a white level, data byte n+1 may indicate a black level, and data bytes n+2, n+3, n+4, n+5 and n+6 and n+7 may indicate Red-x, Red-y, Green-x, Green-y, Blue-x and Blue-y. In addition, data bytes n+8 and n+9 may indicate white-x and white-y. Definition and detailed description of each piece of information may comply with the above description of the current video information.

A color space type may represent a color space which is a basis of dynamic range mapping and color mapping processes. For example, the color space type may designate RGB, YCbCr, XYZ or ACES as a color space. That is, the color space type may indicate RGB when set to 000, indicate XYZ when set to 001, indicate ACES when set to 010 and indicate L*a*b* when set to 011.

Constant luminance represents whether a process which is a basis of dynamic range mapping and color mapping corresponds to constant luminance or non-constant luminance. Here, definition of constant luminance conforms to BT.2020 of ITU-R. This information may be set to represent constant luminance when set to 1.

In addition, a field for identifying an HDR/WCG video information type when there are multiple pieces of HDR/WCG video information, a method and a field for, when HDR/WCG video information is applied differently according to regions, recognizing HDR/WCG video information for each region, a method of designating a process order, and signaling for association with dynamic range and mastering InfoFrame may be added.

Color precision represents precision of color expression and may be used in association with the aforementioned color space type as necessary. For example, in the case of RGB, even the same color can be expressed with different precisions such as 10 bits/12 bits/14 bits. Further, color precision may be represented using a floating point.

A dynamic range mapping type indicates a type of a tone mapping method provided through HDR/WCG InfoFrame. There are various tone mapping methods, such as a linear function, a look-up table (LUT), a logarithmic function and a piecewise curve, and detailed information may be provided through dynamic range mapping information according to type. Here, dynamic range mapping refers to processing related to luminance and may include processing procedures such as a transfer curve and dynamic range compression/extension. The dynamic range mapping type may represent that there is no mapping when set to 000, represent that a linear function is used as a tone mapping method when set to 001, represent that a logarithmic function is used as a tone mapping method when set to 010, represent that an exponential function is used as a tone mapping method when set to 011, represent that an S-curve is used as a tone mapping method when set to 100, represent that a piecewise curve is used as a tone mapping method when set to 101 and represent an LUT when set to 110.

An embodiment using an LUT will be described. An LUT is a table for matching input values with output values and may be regarded as a set of a specific number of points (e.g., 32 points). When the dynamic range mapping type represents an LUT, the dynamic range mapping type may include a subblock length and data bytes n to n+2N+1. Data byte n of the dynamic range mapping information may include an LUT type and an LUT interpolation type. Data byte n+1 may include information about the number of points, data byte n+2 may include information about input sample 1, data byte n+3 may include information about output sample 1, data byte n+4 may include information about input sample 2, data byte n+5 may include information about output sample 2, data byte n+2N may include information about input sample N and data byte n+2N+1 may include information about output sample N. Here, the LUT type may be represented as an LUT dimension and indicates the dimension of the LUT. The LUT dimension may indicate a 1-dimensional LUT (1D LUT) when the LUT type is 00 and indicate a 3-dimensional LUT (3D LUT) when the LUT type is 01. The aforementioned LUT indicates an example of a 1D LUT.

An LUT interpolation type may be used to designate an input/output sample interpolation method.

Number of Points may be used to indicate the number of input/output samples. When Number of Points is 10 bits, this indicates a value in the range of 2 to 1023.

A description will be given of an embodiment with respect to a piecewise curve type. As a method for dynamic range mapping, a piecewise curve which applies different curves to a plurality of pieces may be considered. Here, input/output values for designating each piece are necessary to designate a curve suitable for each piece and a coefficient according thereto. When the dynamic range mapping type is a piecewise curve, dynamic range mapping information (tone mapping information) may include a subblock length and data bytes n to n+4N+2. Data byte n of the dynamic range mapping information may include Number of Points. In addition, data byte n+1 may include information about a 0-th curve type, data byte n+2 may include information about a 0-th coefficient, data byte n+3 may include information about a first input, data byte n+4 may include information about a first output, data byte n+5 may include information about a first curve type, data byte n+6 may include information about a first coefficient, data byte n+4N−1 may include information about an N-th input, data byte n+4N may include information about an N-th output, data byte n+4N+1 may include information about an N-th curve type, and data byte n+4N+2 may include information about an N-th coefficient. Number of Points represents the number of input/output samples. In the aforementioned embodiment, a case in which N sample points are provided is considered, which represents a function composed of N+1 pieces. A curve type represents a type of a piecewise curve. Various curves such as a linear function, a step function, a logarithmic function, an exponential function and an m-order function may be predetermined.

Coefficients represent coefficients according to curve types. For example, it is necessary to deliver information about an order with respect to a curve of an m-order function type, and information about a base may be delivered through coefficients with respect to a curve of a logarithmic function.

A color mapping type represents a type of color mapping method provided through HDR/WCG InfoFrame. A method such as a matrix and a look-up table may be used and detailed information may be provided through color mapping information according to type thereof. Color mapping refers to processing related to chrominance and may include gamut shaping or gamut mapping with respect to a color gamut. The color mapping type may represent that there is no mapping when set to 000, represent that a gain-offset is used when set to 001, represent that matrix conversion is used when set to 010, represent that an LUT is used when set to 011, and represent that an advanced mapping method is used when set to 100. Although it is assumed that dynamic range mapping and color mapping are performed as separate processes in the present invention, the two processes may be performed as one process, and in this case, the dynamic range mapping type and the color mapping type may be provided as a single piece of information instead of separate pieces of information. That is, the dynamic range mapping type and the color mapping type may be signaled through a single piece of information.

In the following, a method using matrix conversion will be described as a color mapping method. In this case, the number of columns, the number of rows and coefficients of a matrix may be delivered. For example, color mapping information may include a subblock length and data bytes n to n+M1+M* when the color mapping type is matrix conversion. Data byte n of the color mapping information may include M1 which is the number of rows and M2 which is the number of columns. In addition, data bytes n+1 may include information about a first coefficient included in the matrix, data byte n+2 may include information about a second coefficient, and data byte n+M1*M2 may include information about an (M1*M2)-th coefficient.

FIG. 4 illustrates InfoFrame including dynamic range information and color gamut information according to another embodiment of the present invention. The HDR/WCG video InfoFrame has been defined and detailed information included therein has been described in the above embodiment. In the present embodiment, AVI InfoFrame (version 3) predefined in CEA 861 is extended to deliver information related to dynamic range mapping and color mapping. Alternatively, AVI InfoFrame (version 4) of a new version may be defined to deliver information related to dynamic range mapping and color mapping. As shown, AVI InfoFrame may include InfoFrame type code information that may have a value of 0x02 which indicates AVI InfoFrame. In addition, AVI InfoFrame may include InfoFrame version number information which indicates that AVI InfoFrame has been extended when set to 3 and indicates that AVI InfoFrame is newly defined when set to 4, as described above. Further, AVI InfoFrame may include InfoFrame length information, data bytes 1 to 18 and N1 to N4 data bytes. Data bytes 1 to 13 may include information on predefined AVI InfoFrame. Data bytes 14 to 18 and N1 to N4 data bytes may represent extended AVI InfoFrame and include dynamic range information and color gamut information. Data byte 14 may include a frame grouping type and data byte 15 may include Update From Previous Frame Info, Cancel Previous Info, Reuse Current Frame Info, and End of Additional HDR Video information. Data byte 16 may include Current Video Info Present and Target Info Present. Data byte 17 may include dynamic ranging mapping type information and color mapping type information. Data byte 18 may include color precision, color space type and constant luminance. N1 data bytes may include current video information if Current Video Info Present is set to 1 and N2 data bytes may include target video information if Target Info Present is set to 1. In addition, N3 data bytes may include dynamic range mapping information and N4 data bytes may include color mapping information. Detailed description of the information is identical to definition in the above-described HDR/WCT video InfoFrame and thus is omitted. According to the above-described embodiments of the present invention, predefined AVI InfoFrame may be extended or AVI InfoFrame may be newly defined to deliver dynamic range information and color gamut information together to a sink device.

Next, a method of delivering display related information from a sink device to a source device will be described. In the present invention, the sink device processes HDR/WCG video on the basis of information delivered from the source device and then displays the processed HDR/WCG video. In this case, a new tag code may be defined in the extended display identification data (EDID) or a predefined part may be extended to signal display related information. Alternatively, display related information may be signaled by newly defining the same in display ID or by using a predefined display parameters data block, a display device data block, a vendor-specific data block, a product identification data block and the like.

Additional signaling information which indicates that AVI InfoFrame has been extended may be included in the previous AVI InfoFrame as necessary. This signaling information may be defined in dynamic range and mastering InfoFrame. In this case, a method for indicating whether AVI InfoFrame has been extended may be included in order to secure compatibility with previous specifications.

FIG. 5 illustrates a method of delivering display related information using the EDID. This method is an embodiment with respect to a case in which a data block is newly defined in the EDID and may be equally applied to other cases. In this case, post-processing related information, that is, information about whether processing with respect to dynamic range mapping and color mapping is possible may be delivered.

The first byte of the EDID may include a tag code and information indicating the length of the following data block in bytes. The second byte of the EDID may include an extended tag code which may have a value of 0x07 reserved for video related blocks. In this case, the extended tag code can indicate that the corresponding data block is an HDR/WCG video information data block. The third byte may include a color space and the fourth byte may include constant luminance. In addition, the fifth byte may include current video info request information and target video info request information. The sixth byte may include dynamic range mapping information and the seventh byte may include color mapping information.

The extended tag code may define the HDR/WCG video information data block using a reserved extension tag code value. In the present embodiment, 0x07 among reserved tag codes can be used.

The color space (CS) may represent a color space which can be used in the sink device during dynamic range mapping and color mapping. For example, the CS can indicate RGB, XYZ, ACES and L*a*b* can be used when set to 1 for each bit. In addition, the CS may include and deliver meaning corresponding to color precision of InfoFrame. That is, 10-bit RGB and 12-bit RGB may be represented by allocating different bits thereto. Alternatively, an additional signal may be defined.

The constant luminance indicates whether the sink device can process constant luminance and non-constant luminance during dynamic range mapping and color mapping. The constant luminance indicates that the sink device can process constant luminance and non-constant luminance during dynamic range mapping and color mapping when set to 1.

The current video info request information/target video info request information (Cinfo/Tinfo) are bits which request information about current video info/target video info. Cinfo/Tinfo indicate a request for current video info/target video info from the source device.

Dynamic range mapping (DRM) and color mapping (CM) represent dynamic range mapping/color mapping methods executable in the sink device. The source device can optionally transmit information which can be processed in the sink device on the basis of the corresponding information delivered from the sink device.

In another embodiment, when display related information is defined through the predefined dynamic range and mastering data block, extension may be signaled in consideration of backward compatibility. Further, a content color encoding volume supported in the sink device may be additionally represented.

FIG. 6 illustrates a method of delivering display related information using display ID according to another embodiment of the present invention. This corresponds to a method of adding information to the display parameters data block of DisplayID. The display parameters data block is a part which defines parameters of a display device or a sink device. The display parameters data block includes information such as a horizontal image size, a vertical image size, a horizontal pixel count, a vertical pixel count, feature support flags, gamma used in a transfer function, a display aspect ratio and a pixel bit depth. The aforementioned dynamic range mapping and color mapping related information may be delivered along with the display parameters data block to the source device.

In the figure, the display parameters data block may be extended to offsets N to N+4 and may further include a color space, constant luminance, dynamic range mapping information and color mapping information in the extended part.

Examples of detailed information included in the information have been described above and thus description thereof is omitted.

FIG. 7 illustrates a method of delivering display related information using display ID according to another embodiment of the present invention. This corresponds to a method of adding information to the display device data block of DisplayID. The display device data block is a part which defines panel characteristics of a display device. The display device data block may include information about a display device type, a display device operating mode, a device native pixel format, a display aspect ratio, a bit depth and response speed. In the present embodiment, the information included in the display device data block and the above-described dynamic range mapping and color mapping related information may be delivered to a source device. In the figure, the display device data block may be extended to offsets N to N+4 and may further include a color space, constant luminance, dynamic range mapping information and color mapping information in the extended part. Examples of detailed information included in the information have been described above and thus description thereof is omitted.

Similarly, dynamic range mapping and color mapping related information may be delivered to the source device using a vendor-specific data block of DisplayID. The vendor-specific data block may be used when information which is not defined in the current data block needs to be transmitted. Previous data blocks do not have a part which defines a dynamic range of a display panel, and thus the above-described dynamic range mapping and color mapping related information may be delivered using the vendor-specific data block.

Figure 8:
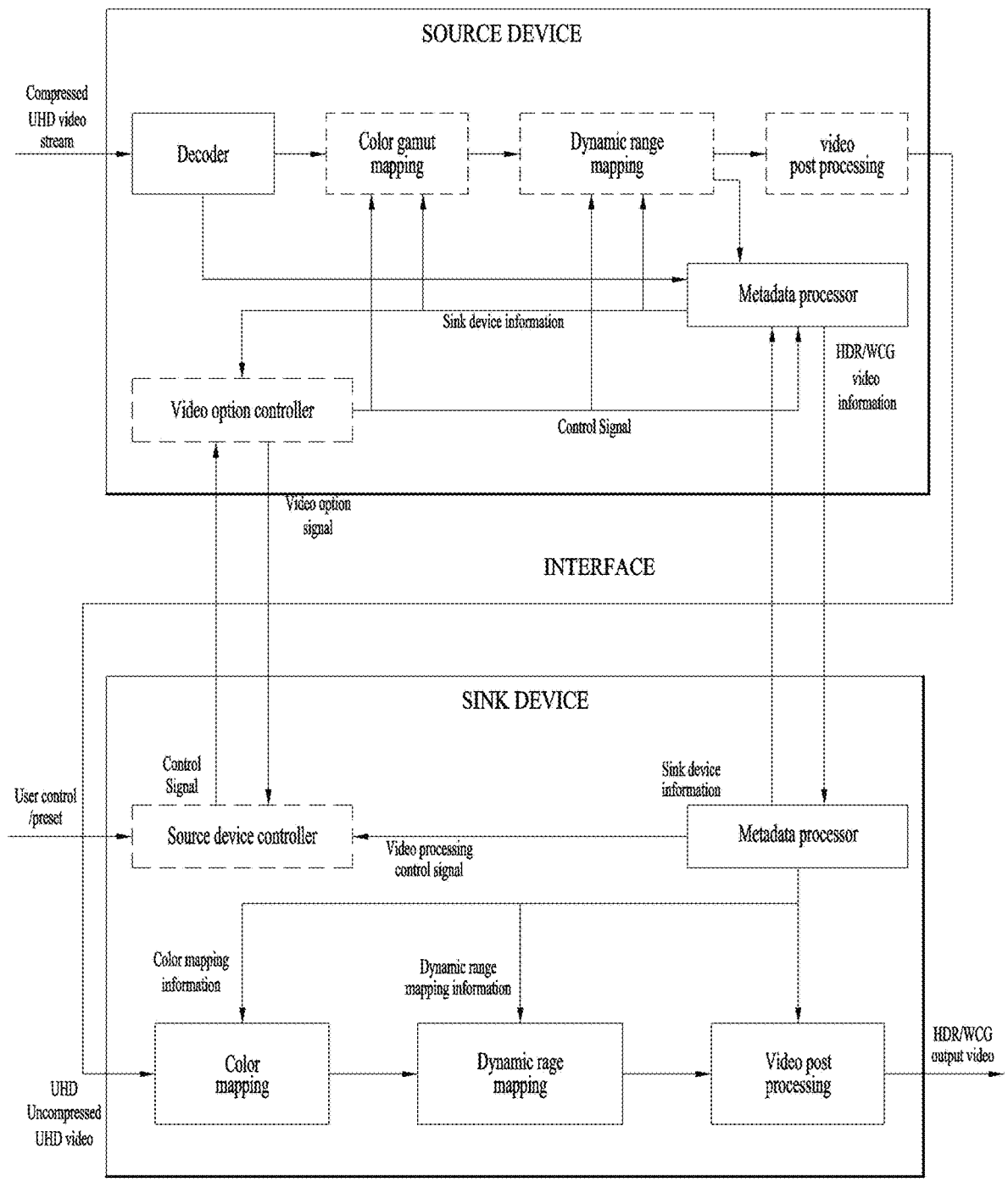
FIG. 8 illustrates operations of a source device and a sink device for adaptive video processing according to an embodiment of the present invention.

FIG. 8 illustrates operations of a source device and a sink device for adaptive video processing according to an embodiment of the present invention. The source device may include a decoder for decoding a compressed video stream, a color gamut mapper for performing color gamut mapping, a dynamic range mapper for performing dynamic range mapping, a video processor for post-processing a video signal included in the video stream, a metadata processor for acquiring and processing metadata, and a transmitter/receiver. The transmitter/receiver may transmit a video signal and transmit/receive metadata. According to an embodiment, the source device may further include a video option controller.

The sink device may include a color mapper for performing color mapping, a dynamic range mapper for performing dynamic range mapping, a video processor for post-processing a video signal, a metadata processor for acquiring and processing metadata and a transmitter/receiver. The transmitter/receiver may receive a decoded compressed video signal and transmit/receive metadata. According to an embodiment, the sink device may further include a source device controller.

In the present invention, operation scenarios may be classified according to sink device capabilities, and each scenario may include 1) information exchange between the source device and the sink device, 2) video processing and 3) display, which correspond to a process through which the source device acquires metadata information of the sink device, video processing based on information about display and video, and a process of outputting delivered video, respectively. In the present embodiment, WCG and HDR are considered and a case in which video processing is performed in the sink device may be considered.

Here, different operations may be performed according to capabilities of the sink device. When the sink device cannot process video information (i.e., in the case of a legacy device), the source device may secure content suitable for a legacy display device or generate a video format adapted to the legacy display device through video processing. Conversely, when the sink device has sufficient capabilities to output images with enhanced video quality without processing information of content, images can be presented without additional processing according to determination of the source device or the sink device. In the following, a case in which the source device and the sink device can process video/display information is assumed.

In the first step, the sink device may deliver display metadata to the source device using the transmitter. Here, information about EOTF defined in color primary information in the EDID (based on CEA 861-F) and HDR static metadata data block based on CEA 861.3, a supportable static metadata type, desired content max luminance, desired content max frame average luminance and desired content min luminance may be delivered, and this information may be processed in the metadata process of the source device. This information may be stored in the source device (e.g., the metadata processor) after being delivered to the source device during source-sink handshaking, and then continuously referred to. Alternatively, the sink device may be requested to deliver this information as necessary.

In addition, video processing related information (dynamic range mapping type, color mapping type, color space type, constant luminance, etc.) defined in the present invention and supported by the sink device may be delivered to the source device. This information may be delivered during the aforementioned handshaking process or when the corresponding function is needed.

Furthermore, a control signal with respect to the source device may be delivered. In this case, the source device controller included in the sink device may determine a display processing range on the basis of information about types of video processing which can be performed by the source device and deliver the control signal according to the determined result. Alternatively, a control signal for a module set by default may be delivered without information about the sink device. The present invention is described on the basis of a method of delivering a default value for a source device control signal or delivering no default value in the initial stage.

The aforementioned handshaking process is an operation performed when the source device and the sink device are connected, and when different pieces of content such as broadcast and streaming are continuously reproduced in a state in which the source device and the sink device are connected, signal exchange between the devices may be required at a content change time or a specific scene change time.

In the second step, the source device may deliver HDR/WCG video information to the sink device using the transmitter. The source device may decode a compressed HDR/WCG stream (UHD video stream) and then acquire information about video. The metadata processor included in the source device acquires the information about video on the basis of metadata (e.g., a WCG SEI message, an HDR SEI message or the like) delivered along with the video. The information may include not only a color gamut, a dynamic range and an electro-optical transfer function but also static metadata such as display color primary, white point, display max/min luminance, max content luminance and max frame-average luminance. In addition, dynamic range mapping and color mapping related information may be included. The aforementioned information may be delivered through VUI and SEI messages, and specifically, through a method defined in SEI messages defined in HEVC standards, such as a mastering_display_colour_volume SEI message, a knee_function_info SEI message and a color_remapping_info SEI message.

When HDR/WCG video processing is performed in the source device, the aforementioned information is processed in the source device using the video processor. However, when the sink device performs HDR/WCG video processing, the metadata processor of the source device needs to send the aforementioned information delivered through a video stream to the sink device in an appropriate format. Here, the metadata processor may deliver the aforementioned information using the transmitter. For example, processing in a more suitable device can be determined through information exchange through the video option controller. Here, information which can be processed in the sink device may be selectively sent on the basis of display metadata information about the sink device, which is delivered in the aforementioned first step. If information is limited, the information may be set to be delivered all the time. If it is determined that information is not processed as in a legacy display, the information may not be sent. When it is determined that the sink device can process information, it is possible to deliver color gamut information through the aforementioned AVI InfoFrame and to deliver the EOTF, static metadata type, and dynamic range related information (color primary, white point and max/min luminance) and content information (max content light level and max frame-average light level) of a mastering display through dynamic range and mastering InfoFrame. In addition, it is possible to deliver the aforementioned detailed dynamic range mapping and color mapping related information (current video information, target information, dynamic range mapping information, color mapping information, color space information and constant luminance information) through the method proposed by the present invention. Information delivered through other InfoFrame may be defined and delivered together with the aforementioned information through the proposed method as necessary.

Information delivery from the source device to the sink device may depend on frame grouping type, and information may be delivered with transmission frequency adapted to characteristics thereof, for example, in units of frame or scene.

In the third step, dynamic range mapping and color mapping may be performed. The sink device may perform dynamic range mapping and color mapping using the dynamic range mapper and the color mapper on the basis of video processing information received from the source device. Here, the sink device may determine whether mapping signaled through current video information and target information delivered from the source device needs to be used and apply mapping. A separate module for mapping may be configured or mapping may be performed using a module related to dynamic range mapping/color mapping, which is configured in the sink device.

In the fourth step, the sink device may display final UHD video. Here, while the sink device can present the video processed through the source device, the sink device may determine whether the video has been processed to be adapted to the display through the metadata processor and generate a control signal through the source device controller. That is, when the video has not been suitably processed, the sink device may determine a part having a problem during video processing of the source device and deactivate the part through the control signal. Further, the sink device may process video data using the video processor (video post-processor) as necessary.

Alternatively, a desired function may be turned on/off at the request of a user. To this end, the sink device may provide video processing options which can be processed or is being processed in the source device and a menu/user interface (UI) for controlling the same to the user. In addition, when there is a function of adjusting luminance and color of the display, information of the metadata processor of the sink device may be analyzed and then the display is controlled through a display panel controller to provide a presentation environment (presentation luminance) suitable for content.

Although the HDR/WCG video information may be delivered by defining new InfoFrame or extending AVI InfoFrame as described above, the HDR/WCG video information may be defined in dynamic range and mastering InfoFrame as the concept of additional information related to HDR/WCG. Here, 1) a new value is allocated to a predefined static_metadata_descriptor ID to define HDR/WCG video information, 2) static_metadata_descriptor may be extended, 3) EMD_ID may be defined and delivered as additional information distinguished from SMD or 4) separate InfoFrame may be defined and then information thereof may be delivered.

FIG. 9 illustrates a method of extending static metadata descriptor ID of video information and delivering the video information to the sink device. As a method of providing additional information related to HDR/WCG video, a static_metadata_descriptor ID (SMD_ID) may be additionally defined. For example, in addition to previous definition of static metadata type 1 when SMD_ID=0, SMD_ID indicates HDR/WCG video information when set to 1.

Here, information indicating a video information application range (e.g., units of frame, scene and content) such as frame grouping type, information for which a unit of transmission from the source device to the sink device needs to be determined, and major information may be defined using reserved bits of the existing dynamic range and mastering InfoFrame. Example of the major information may include color space type, color precision and constant luminance. In other words, information in HDR/WCG video information may be applied to entire content or applied to a scene or a frame in the content depending on frame grouping type. When the HDR/WCG video information is applied to entire content, the video information may be used as static metadata.

As shown, the dynamic range and mastering InfoFrame may include InfoFrame type code that may have a value of 0x07 which indicates dynamic range and mastering InfoFrame. In addition, the dynamic range and mastering InfoFrame may include InfoFrame version number information which may have a value of 0x01. Further, the dynamic range and mastering InfoFrame may include InfoFrame length information, data bytes 1 to 6 and N1 to N4 data bytes. Data bytes 2 to 6 and N1 to N4 data bytes are extensions of static metadata descriptor ID and may include dynamic range information and color gamut information described in the present invention. Data byte 1 may include EOTF. Data byte 2 may include frame grouping type and static_metadata_descriptor ID (SMD_ID). As described above, SMD_ID may have a value of 1, which indicates that a static metadata descriptor is HDR/WCG video information metadata type. Data byte 3 may include Update From Previous Frame info, Cancel Previous info, Reuse Current info and End of HDR/

WCG video information. Data byte 4 may include Current Video Info Present and Target Info Present. Data byte 5 may include dynamic range mapping type information and color mapping type information. Data byte 6 may include color precision, color space type and constant luminance N1 data bytes may include current video information when the aforementioned Current Video Info Present is set to 1 and N2 data bytes may include target video information when the aforementioned Target Info Present is set to 1. In addition, N3 data bytes may include dynamic range mapping information and N4 data bytes may include color mapping information. Detailed description of the information may be identical to the aforementioned definition of the HDR/WCG video information and thus is omitted. According to the embodiment of the present invention, the predefined static metadata descriptor ID of the dynamic range and mastering InfoFrame may be extended to deliver dynamic range information and color gamut information together to the sink device.

FIG. 10 illustrates a method of extending the static metadata descriptor and delivering video information to the sink device according to another embodiment of the present invention. A method of extending the static_metadata_descriptor (SMD) and delivering the HDR/WCG video information may be conceived. For example, when SMD_ID=0, the HDR/WCG video information defined in the present invention is delivered after display_primary, white_point, min/max luminance, MaxCLL and MaxFALL defined in data bytes 3 to 26 of SMD. This method may be used not only to define the HDR/WCG video information but also to extend predefined SMD_ID. Here, a new version number (e.g., 0x02) may be assigned, and when backward compatibility is considered, the following method provided by the present invention may be used.

As shown, dynamic range and mastering InfoFrame may include InfoFrame type code that may have a value of 0x07 which indicates dynamic range and mastering InfoFrame. In addition, the dynamic range and mastering InfoFrame may include InfoFrame version number information which may have a value of 0x01. Further, the dynamic range and mastering InfoFrame may include InfoFrame length information, data bytes 1 to n+5 and N1 to N4 data bytes. Data bytes n+1 to n+5 and N1 to N4 data bytes are extensions of static metadata descriptor and may include dynamic range information and color gamut information described in the present invention. Data byte 1 may include an SMD extension flag and EOTF. Data byte 2 may include the length of SMD extension or the length of SMD and SDM ID. In addition, data byes 3 to n may include information included in the static metadata descriptor (SMD). SMD extension information may be included in data byte n+1 and following data bytes. Data byte n+1 may include frame grouping type. Data byte n+2 may include Update From Previous Frame info, Cancel Previous info, Reuse Current info and End of HDR/WCG video information. Data byte n+3 may include Current Video Info Present and Target Info Present. Data byte n+4 may include dynamic range mapping type information and color mapping type information. Data byte n+5 may include color precision, color space type and constant luminance. N1 data bytes may include current video information when the aforementioned Current Video Info Present is set to 1 and N2 data bytes may include target video information when the aforementioned Target Info Present is set to 1. In addition, N3 data bytes may include dynamic range mapping information and N4 data bytes may include color mapping information.

The SMD_extension_flag may be used to indicate that the predefined static metadata descriptor has been extended.

The length of SMD extension or the length of SMD indicates the length of the descriptor and may be used to distinguish the extended descriptor from the previous descriptor. An example of representing the length of the extended descriptor is described in the present invention. In this case, information on the length of following HDR metadata InfoFrame may be used to indicate the length of previous SMD. For example, when SMD_extension_flag is 1, the total length of the descriptor corresponds to the sum of the length of following HDR Metadata InfoFrame and the length of SMD extension. When the length of following HDR Metadata InfoFrame indicates the total length of the descriptor, the length of the previous descriptor may be indicated using the length of SMD instead of the length of SMD extension.

According to an embodiment, a method of comparing the length of following HDR metadata InfoFrame with the length of SMD extension and indicating additional extension when the lengths are different from each other without using the SMD_extension_flag may be used.

In the above embodiment, information indicating an information application range (e.g., units of frame, scene and content) such as frame grouping type, information for which a unit of transmission from the source device to the sink device needs to be determined, and major information may also be defined using reserved bits of the existing dynamic range and mastering InfoFrame. Here, information defined in SMD extension may be information applied to entire content or applied to a scene/frame depending on frame grouping type.

Detailed description of other pieces of information may be identical to the aforementioned definition of the HDR/WCG video information and thus is omitted. According to the embodiment of the present invention, the predefined static metadata descriptor of the dynamic range and mastering InfoFrame may be extended to deliver dynamic range information and color gamut information together to the sink device.

Figure 11:
FIG. 11 illustrates a method of separately defining a dynamic metadata descriptor ID and delivering video information to a sink device according to another embodiment of the present invention.

FIG. 11 illustrates a method of separately defining a dynamic metadata descriptor ID and delivering video information to the sink device according to another embodiment of the present invention. In another embodiment, a case in which information independent of static metadata is delivered in dynamic range and mastering InfoFrame (InfoFrame type=0x07) simultaneously with the static metadata may be conceived. Although only the descriptor is extended in the above-described embodiment, metadata properties are clearly classified and an ID is assigned to extended metadata to simultaneously deliver various types of metadata in the present embodiment.

As shown, dynamic range and mastering InfoFrame may include InfoFrame type code that may have a value of 0x07 which indicates dynamic range and mastering InfoFrame. In addition, the dynamic range and mastering InfoFrame may include InfoFrame version number information which may have a value of 0x01. Further, the dynamic range and mastering InfoFrame may include InfoFrame length information, data bytes 1 to n+5 and N1 to N4 data bytes. Data bytes n+1 to n+5 and N1 to N4 data bytes include information of an extended metadata descriptor and may include dynamic range information and color gamut information described in the present invention. Data byte 1 may include an Extended_Metadata_Descriptor_ID and EOTF. Data byte 2 may include the length of extended metadata descriptor ID and SDM ID. In addition, data bytes 3 to n may include information of a static metadata descriptor (SMD). The information of the extended metadata descriptor may be included in data byte n+1 and following data bytes. Data byte n+1 may include frame grouping type. Data byte n+2 may include Update From Previous Frame info, Cancel Previous info, Reuse Current info and End of HDR/WCG video information. Data byte n+3 may include Current Video Info Present and Target Info Present. Data byte n+4 may include dynamic range mapping type information and color mapping type information. Data byte n+5 may include color precision, color space type and constant luminance. N1 data bytes may include current video information when the aforementioned Current Video Info Present is set to 1 and N2 data bytes may include target video information when the aforementioned Target Info Present is set to 1. In addition, N3 data bytes may include dynamic range mapping information and N4 data bytes may include color mapping information.

The Extended_Metadata_descriptor_ID (EMD ID) identifies additional information. Here, the EMD ID may serve as an identifier for indicating metadata having a characteristic/type different from the SMD ID and identify the type of the HDR/WCG video information proposed by the present invention. The EMD ID may indicate that there is no extended metadata when set to 0, indicate HDR/WCG video information metadata type 1 when set to 1 and indicate HDR/WCG video information metadata type 2 when set to 2. EMD IDs may be divided according to descriptor types. For example, EMD IDs may be divided in a case in which different dynamic range mapping and color mapping methods are used, in the case of different application units (scene and frame), in the case of different types of target information, that is, in a case in which parts of target information are different, etc.

In the present embodiment, it is assumed that the Extended_Metadata_Descriptor ID includes the role of the SMD_extension_flag defined in the aforementioned embodiment. That is, EMD_ID may indicate presence of only SMD when set to 0 and indicate presence of a different type of metadata following the static_metadata_descriptor when set to a value greater than 0. Conversely, a case in which SMD is not present and only EMD is present may be conceived. For example, when SMD_ID may indicate no static metadata descriptor when SMD_ID==7.

The length of extended metadata descriptor may be used to indicate the length of the EMD. The length of extended metadata descriptor may signal no EMD when set to 0. The length of SMD may be additionally designated as necessary. Detailed description of other pieces of information may be identical to the aforementioned definition of the HDR/WCG video information and thus is omitted. According to the embodiment of the present invention, the predefined static metadata descriptor of the dynamic range and mastering InfoFrame may be extended to deliver dynamic range information and color gamut information together to the sink device.

FIG. 12 illustrates a method of defining a separate InfoFrame for video information according to an embodiment of the present invention. Distinguished from the method of extending the dynamic range and mastering InfoFrame, a method of defining a separate InfoFrame may be conceived. Here, information included in the dynamic range and mastering InfoFrame is correlated with information included in the HDR/WCG video InfoFrame in that they have information for HDR/WCG content, production environment and display, and signaling considering the correlation is required.

To this end, data byte 1 of the dynamic range and mastering InfoFrame may include extended metadata descriptor ID and data byte 2 thereof may include a frame grouping type and an HDR/WCG video info present flag. The HDR/WCG video info present flag is defined in the dynamic range and mastering InfoFrame and may indicate presence or absence of HDR/WCG video InfoFrame. That is, the HDR/WCG video info present flag signals presence of detailed information related to HDR/WCG video, that is, information related to tone mapping and color mapping in units of content/scene/frame as in the present embodiment such that a receiver can use only information in the SMD and refer to enhanced information.

Detailed information about the HDR/WCG video InfoFrame, such as EMD_ID, frame grouping type and color space type, may be signaled using reserved bits in the dynamic range and mastering InfoFrame as necessary. Alternatively, target information and current video information may be signaled in the SMD as necessary.

As described above, the dynamic range and mastering InfoFrame can signal presence or absence of the HDR/WCG video InfoFrame. As shown, the HDR/WCG video InfoFrame may include InfoFrame type code that may have a value of 0x08 which indicates the HDR/WCG video InfoFrame. In addition, the HDR/WCG video InfoFrame may include InfoFrame version number information which may have a value of 0x01. Further, the HDR/WCG video InfoFrame may include InfoFrame length information, data bytes 1 to 5 and N1 to N4 data bytes. Data byte 1 may include Extended_Metadata_Descriptor_ID and frame grouping type. Data byte 2 may include Update on Dynamic Range and Mastering InfoFrame flag, Update From Previous Frame info, Cancel Previous info, Reuse Current info and End of HDR/WCG video information. Data byte 3 may include Current Video Info Present and Target Info Present. Data byte 4 may include dynamic range mapping type information and color mapping type information. Data byte 5 may include color precision, color space type and constant luminance. N1 data bytes may include current video information when the aforementioned Current Video Info Present is set to 1 and N2 data bytes may include target video information when the aforementioned Target Info Present is set to 1. In addition, N3 data bytes may include dynamic range mapping information and N4 data bytes may include color mapping information.

The Extended_Metadata_descriptor_ID is the same as defined in the previous figure. In the present embodiment, however, separate InfoFrame is defined and thus EMD_ID may be used when descriptors are divided according to types.

The Update on Dynamic Range and Mastering InfoFrame flag is defined in the HDR/WCG video InfoFrame and signals whether information included in the dynamic range and mastering InfoFrame has been changed. For example, when information about entire content is delivered through the dynamic range and mastering InfoFrame, the dynamic range and mastering InfoFrame can be delivered only in environments such as initial part of content, channel change and initial part of GOP, and information update situation thereafter can be monitored through the Update on Dynamic Range and Mastering InfoFrame flag. For stabilized operation, the condition that the flag must be maintained for several seconds before the dynamic range and mastering InfoFrame is changed or for several seconds from a changed frame may be provided as necessary.

Detailed information about other pieces of information may be the same as definition in the HDR/WCG video InfoFrame and thus is omitted.

FIG. 13 illustrates a method of delivering sink device information to a source device according to an embodiment of the present invention. When HDR/WCG video information is delivered in the dynamic range and mastering InfoFrame or HDR/WCG video InfoFrame is separately defined as in the above-described embodiments, the predefined HDR static metadata data block may be extended to deliver HDR/WCG video information from a sink device to a source device as shown in the figure.

The HDR static metadata data block may have extended tag code of 0x06, and first to seventh bytes may include the existing information of the HDR static metadata data block. In addition, eighth to thirteenth bytes may include information extended in association with HDR/WCG video information. The thirteenth byte may include extended metadata (EM) which indicates extended metadata type. That is, the EM indicates whether the sink sevice can process extended metadata corresponding to EMD_ID defined in the above-described embodiment. The EM indicates that the sink device can process the extended metadata when set to 1 and indicates that the sink device cannot process the extended metadata when set to 0. Here, DRM, CM, CS and CL may be signaled by being included in the EM. In this case, DRM, CM, CS and CL may not be separately signaled. In addition, DRM and CM may be used as parameters in the EM. That is, the parameters may be used when EM type changes according to DRM and CM. Information such as DRM, CM, CS, CL, Cinfo and Tinfo conform to the definition in the above-described embodiments.

FIG. 14 illustrates a method of delivering sink device information to a source device according to an embodiment of the present invention. When HDR/WCG video information is delivered in the dynamic range and mastering InfoFrame or HDR/WCG video InfoFrame is separately defined as in the above-described embodiments, a separate HDR/WCG video information data block may be allocated to deliver HDR/WCG video information from a sink device to a source device as shown in the figure. The separate HDR/WCG video information data block may be defined in the EDID and DisplayID as in the aforementioned embodiments. The HDR/WCG video information data block may have extended tag code of 0x07 and may include first to eighth bytes. The first byte may include tag code (0x07) and data block length information. The second byte may include extended tag code (0x07) and may indicate the HDR/WCG video information data block. The third to seventh bytes may include CS, CL, Cinfo, Tinfo, DRM, CM and EM which have been described in the aforementioned embodiments. The fourth byte may include a dynamic range metadata information request (DRMI_req) in addition to CL information. The DRMI_req is a flag which requests dynamic range metadata information and corresponds to the Update on Dynamic Range and Mastering InfoFrame flag in the InfoFrame. For example, when the Update on Dynamic Range and Mastering InfoFrame flag is 1, the DRMI_req may be set to 1 to request changed dynamic range metadata information from the source device. The eighth byte may include extended metadata (EM) which indicates extended metadata type. That is, the EM indicates whether the sink device can process extended metadata corresponding to EMD_ID defined in the above-described embodiment. The EM indicates that the sink device can process the extended metadata when set to 1 and indicates that the sink device cannot process the extended metadata when set to 0.

In the following, an embodiment with respect to a case in which multiple pieces of information are delivered will be described. When multiple pieces of information are delivered, if processing is performed differently according to local features in frames, a method of delivering local feature information and a related processing method (dynamic range mapping information and color mapping information) may be considered. Alternatively, the method may be considered when various targets are set, various processing methods are provided, different processing methods are provided for a multiview image according to views, and the like. Here, various types of information may be delivered in one InfoFrame, and each type of information is delivered through information type and information necessary for each type of information is delivered. Although current video information, target information, DRM information and CM information are delivered for each type of information in the following embodiment, the information may be selectively sent or may be sent in higher category when applied to all types of information.

In the following case, a separate InfoFrame is defined. As necessary, the separate InfoFrame may be defined in the existing InfoFrame as in the previous invention.

FIG. 15 illustrates a method of defining a separate InfoFrame for video information according to an embodiment of the present invention. HDR/WCG video InfoFrame may include InfoFrame type code having a value of 0x08 which indicates the HDR/WCG video InfoFrame, as shown in the figure. In addition, the HDR/WCG video InfoFrame may include InfoFrame version number which may have a value of 0x01. Further, the HDR/WCG video InfoFrame may include InfoFrame length information, data bytes 1 to 8 and N0 to N5 data bytes per information set. Data byte 1 may include Extended_Metadata_Descriptor ID and frame grouping type. Data byte 2 may include a multiple info flag, Update on Dynamic Range and Mastering InfoFrame flag, Update from Previous Frame Info, Cancel Previous Info, Reuse Current Info and End of HDR/WCG Video information. Data byte 3 may include Local Feature Info Present, Current Video Info Present and Target Info Present information. Data byte 4 may include dynamic ranging mapping type information and color mapping type information. Data byte 5 may include color precision, color space type and constant luminance Data bytes 6 and 7 may include a multiple target flag, multiple method flag, multiple local feature flag and multiple view flag, and the number of information sets. In addition, each information set may be composed of a data byte including the information on the length of the corresponding information set, and N0 to N5 data bytes. N0 data bytes may include an exclusive info flag, subset existence flag, a total number of subsets, subset number and information type. N1 data bytes may include current video information when the aforementioned Current Video Info Present information is set to 1 and N2 data bytes may include target video information when the aforementioned Target Info Present information is set to 1. In addition, N3 data bytes may include dynamic range mapping information and N4 data bytes may include color mapping information. N5 data bytes may include local feature information. N0 to N5 data bytes may be defined per information set.

The multiple info flag is information which signals whether multiple pieces of information are provided. The multiple info flag may signal provision of multiple pieces of information in advance when set to 1. The local feature info present information signals whether a local feature in a frame is provided. When this information is set to 1, a local feature is provided in addition to entire features. The following information is flags for signaling delivery of multiple pieces of information to a sink device. The multiple target flag indicates a case in which various targets are set when multiple pieces of information are delivered. This information indicates delivery of multiple processing methods for various targets when set to 1. The multiple method flag indicates a case in which various processing methods are delivered during delivery of multiple pieces of information. This information indicates delivery of various processing methods when set to 1. The multiple local feature flag indicates a case in which processing depends on features in a frame during delivery of multiple pieces of information. This information indicates delivery of local feature information and/or a processing method (dynamic range mapping information and color mapping information) for processing depending on features when set to 1. The multiple view flag indicates a case in which different processing methods are provided for a multiview image according to views when multiple pieces of information are delivered. The number of information sets indicates the number of processing methods/features. Length of information set A indicates the length of information A among multiple pieces of delivered information. The following information corresponds to each option with respect to multiple pieces of delivered information. The following information may be defined for each type of information.

The exclusive info flag indicates whether corresponding information is used selectively or overall. For example, when information according to local features is delivered, local features constitute a frame and thus all information included in the local features needs to be used. In this case, the exclusive info flag is set to 0. Conversely, when one of various types of information is selected and used, such as a case in which different processing methods are delivered according to targets, the exclusive info flag is set to 1. Meanwhile, when multiple pieces of information are delivered, multiple pieces of other information may be delivered in the information according to the concept of subset. For example, both a case in which a single processing method is applied to a whole image and a case in which different processing methods are applied according to local features may be supported when information is delivered according to multiple methods. Here, different processing methods according to local features correspond to the concept of subset. In this case, the subset existence flag is set to 1 to additionally signal definition of multiple pieces of information in specific information. The total number of subsets indicates the number of subsets when the subset existence flat is set to 1. The subset number is numbering for identifying subsets when multiple subsets are defined. In the present embodiment, the subset number may have a value in the range of 0 to 7. The information type signals corresponding information among multiple pieces of defined information. Multiple targets, multiple methods, multiple local features and multiple views may be defined as follows and signaled in the present embodiment. That is, the information type can indicate multiple-target information as category 1 when set to 0000. The information type can indicate multiple-local feature information as category 2 when set to 0001. The information type can indicate multiple-method information as category 3 when set to 0010. The information type can indicate multiple-view information as category 4 when set to 0011.

The local feature information signals a method for identifying a local feature when the local feature info present or multiple local feature flag is 1.

Detailed description of other pieces of information may be the same as definition in the aforementioned DNR/WCG video InfoFrame and thus is omitted.

FIG. 16 illustrates a method of delivering multiple pieces of information of a sink device to a source device according to an embodiment of the present invention. As shown, a separate HDR/WCG video information data block may be allocated to deliver HDR/WCG video information from the sink device to the source device. The HDR/WCG video information data block may be defined in the EDID and DisplayID. The HDR/WCG video information data block may have a value of 0x07 and may include first to ninth bytes. The first byte may include tag code (0x07) and data block length information. The second byte may include extended tag code (0x07) and may indicate the HDR/WCG video information data block. The third to seventh bytes may include CS, CL, Cinfo, Tinfo, DRM, CM and EM which have been described in the aforementioned embodiments. The fourth byte may include a dynamic range metadata information request (DRMI_req) in addition to CL information. DRMI_req is a flag which requests dynamic range metadata information and corresponds to the update on dynamic range and mastering InfoFrame flag. For example, when the update on dynamic range and mastering InfoFrame flag is 1, the DRMI_req may be set to 1 to request changed dynamic range metadata information from the source device. The eighth byte may include extended metadata (EM) which indicates extended metadata type. That is, the EM indicates whether the sink device can process extended metadata corresponding to the EMD_ID defined in the above-described embodiment. The EM indicates that the sink device can process the extended metadata when set to 1 and indicates that the sink device cannot process the extended metadata when set to 0. The ninth byte may include multiple extended metadata (Multi_EM). When multiple metadata cannot be processed, Multi_EM is set to 1 to notify the source device that multiple metadata cannot be processed. Here, it is possible to simply signal that multiple metadata can be processed using Multi_EM or to impart a meaning to each bit of Multi_EM to signal subdivided information. For example, it is possible to divide cases in which the sink device can process metadata into a case in which different pieces of metadata according to multiple targets can be processed (e.g., Multi_EM_3==1: multiple target), a case in which different pieces of metadata according to multiple processing methods can be processed (e.g., Multi_EM_2==1: multiple method), a case in which multiple pieces of metadata for applying different methods depending on local features of video can be processed (e.g., Multi_EM_1==1: multiple local feature), and a case in which different pieces of metadata according to multiple views can be processed (e.g., Multi_EM_0==1: multiple view).

When the aforementioned information is used, the source device may sort metadata and selectively deliver appropriate information to the sink device. Alternatively, if the sink device has better processing capabilities, when information which can be processed in the sink device is delivered through Multi_EM, the source device may transmit the corresponding information such that the sink device processes the information.

Figure 17:
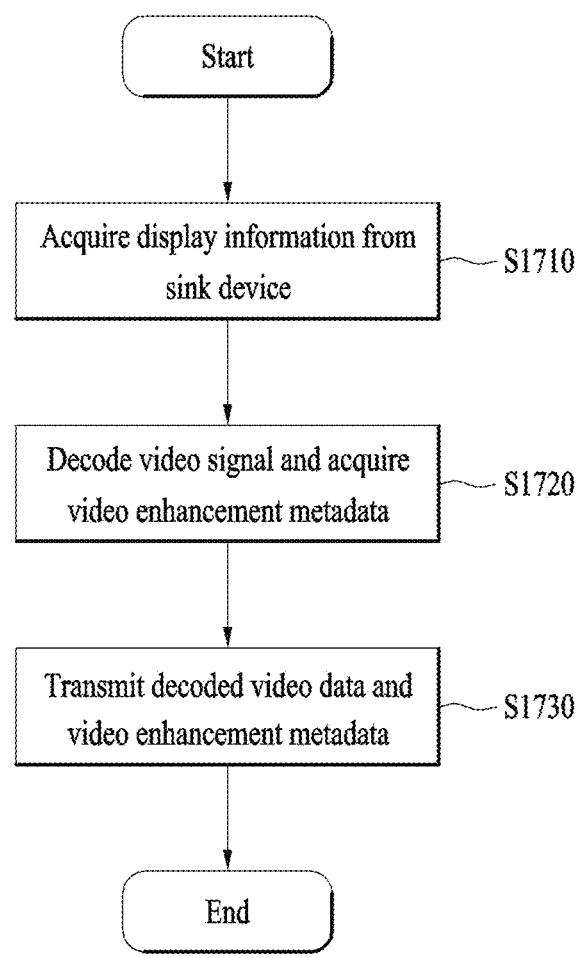
FIG. 17 illustrates a method through which a source device delivers video enhancement metadata to a sink device according to an embodiment of the present invention.

FIG. 17 illustrates a method through which a source device delivers video enhancement metadata to a sink device according to an embodiment of the present invention. The source device may acquire display related information of the sink device from the sink device (S1710). The display related information may be included in a data block defined in the aforementioned EDID or extended EDID and delivered and may include video enhancement metadata processing capability information about the sink device. The source device may selectively deliver video enhancement metadata to the sink device on the basis of the display related information.

The source device may decode a video signal to acquire decoded video data and video enhancement metadata (S1720). Here, the video enhancement metadata may include the aforementioned HDR/WCG video information which can be used for video processing performed by the source device or the sink device.

The source device may deliver the decoded video data and video enhancement metadata to the sink device (S1730). As described above, the video enhancement metadata may be included in an extended InfoFrame or a newly defined InfoFrame and delivered.

Figure 18:
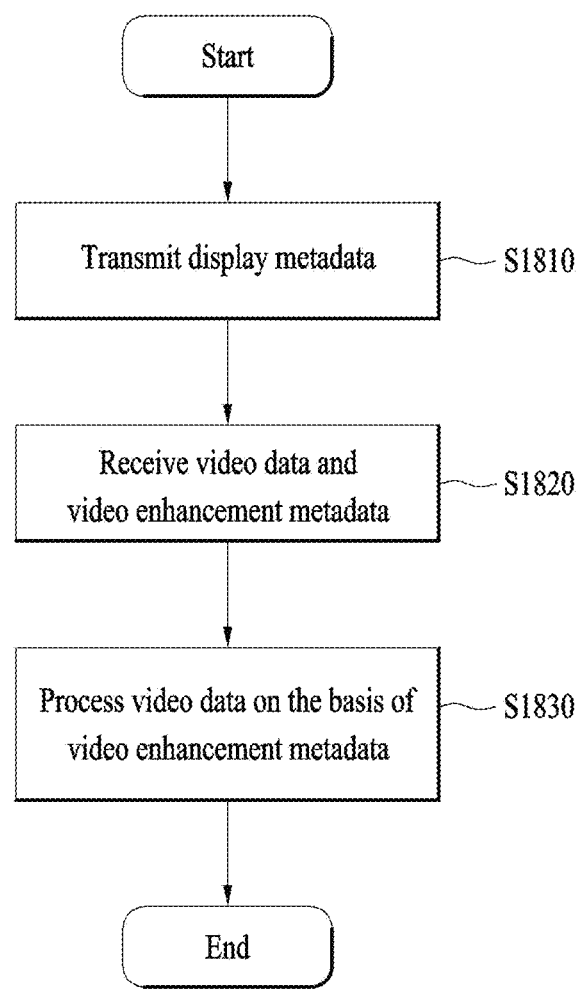
FIG. 18 illustrates a method through which a sink device delivers display metadata to a source device and processes video data according to an embodiment of the present invention.

FIG. 18 illustrates a method through which a sink device delivers display metadata to a source device and processes video data according to an embodiment of the present invention. The sink device may deliver display metadata to the source device (S1810). The display metadata may include video enhancement metadata processing capability information of the sink device. That is, information indicating whether the sink device can process HDR, WCG, extended metadata, color space and constant luminance may be included in the display metadata, as described above. The display metadata may be included in a data block defined in the EDID or extended EDID and delivered.

The sink device may receive video data and video enhancement metadata from the source device (S1820). The video enhancement metadata may include the aforementioned HDR/WCG video information and may be used for post-processing of the received video data. As described above, the video enhancement metadata may be included in the existing InfoFrame or a newly defined InfoFrame and delivered from the source device to the sink device.

The sink device may post-process the video data to reproduce the video data on the basis of the received video enhancement metadata (S1830). Post-processing of the video data may include HDR and WCG related processing, and the sink device can reproduce video data with enhanced video quality.

As described above, the source device and the sink device according to an embodiment of the present invention can exchange display metadata and video enhancement metadata to provide video enhancement effects with respect to video data. The video enhancement metadata can be applied to video data on the basis of synchronization information. Accordingly, video quality enhancement can be applied to all video data or applied per section. A user can be provided with UHD content with enhanced video quality through HDR or WCG information additionally applied to previous UHD content.

Although the description of the present invention is explained with reference to each of the accompanying drawings for clarity, it is possible to design new embodiments by merging the embodiments shown in the accompanying drawings. Additionally, if a recording medium readable by a computer, in which programs for executing the embodiments mentioned in the foregoing description are recorded, is designed by those skilled in the art, this is within the scope of the appended claims and their equivalents.

An apparatus and method according to the present invention may be non-limited by the configurations and methods of the embodiments mentioned in the foregoing description. In addition, the embodiments mentioned in the foregoing description may be configured in a manner of being selectively combined with one another entirely or in part to enable various modifications.

In addition, a method according to the present invention may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like for example and also include a carrier-wave type implementation such as transmission via the Internet. Furthermore, as the processor-readable recording medium is distributed to a computer system connected via network, processor-readable code may be saved and executed in a distributed manner.

It will be appreciated by those skilled in the art that various modifications and variations may be made in the present invention without departing from the spirit or scope of the inventions. Thus, it is intended that the present invention cover the modifications and variations of this invention provided they come within the scope of the appended claims and their equivalents.

Both a product invention and a process invention are described in the specification and the description of both inventions may be supplementarily applied as needed.

MODE FOR INVENTION

Various embodiments have been described in the best mode for carrying out the invention.

INDUSTRIAL APPLICABILITY

The present invention can be used for broadcast and video signal processing and is reproducible and industrially applicable.

What is claimed is:
1. A method for transmitting information to a sink device by a source device, the method comprising:
  acquiring supplemental enhancement information (SEI) message;
  generating an information frame (InfoFrame) including extended data and type information identifying a type of the extended data; and
  transmitting the InfoFrame to the sink device,
  wherein the extended data is High Dynamic Range (HDR) information metadata,
  wherein the type information identifies a type of HDR information metadata,
  wherein the infoFrame includes tone mapping flag for indicating that metadata for a tone mapping function is present, and
  wherein only when the tone mapping flag included in the infoFrame indicates that the metadata for the tone mapping function is present, the metadata for the tone mapping function includes both number information of multiple regions for the tone mapping function and region information for identifying a linear part with a curve part of the tone mapping function.

2. A source device for transmitting information to a sink device, the device comprising:
  a decoder to acquire supplemental enhancement information (SEI) message; and
  a metadata processor to generate an information frame (InfoFrame) including extended data and type information identifying a type of the extended data and transmit the InfoFrame to the sink device, wherein the extended data is High Dynamic Range (HDR) information metadata, wherein the type information identifies a type of HDR information metadata, wherein the infoFrame includes tone mapping flag for indicating that metadata for a tone mapping function is present, and wherein only when the tone mapping flag included in the infoFrame indicates that the metadata for the tone mapping function is present, the metadata for the tone mapping function includes both number information of multiple regions for the tone mapping function and region information for identifying a linear part with a curve part of the tone mapping function.

* * * * *